(12) United States Patent
Fitzpatrick et al.

(10) Patent No.: US 7,171,384 B1
(45) Date of Patent: Jan. 30, 2007

(54) BROWSER INTERFACE AND NETWORK BASED FINANCIAL SERVICE SYSTEM

(75) Inventors: William Fitzpatrick, Howell, NJ (US); John Furlong, Plandome, NY (US); Robert Mauer, Levittown, NY (US); David Hummelberg, Basking Ridge, NJ (US); Brian Martone, Hoboken, NJ (US)

(73) Assignee: UBS Financial Services, Inc., Weehawken, NJ (US)

( * ) Notice: Subject to any disclaimer, the term of this patent is extended or adjusted under 35 U.S.C. 154(b) by 644 days.

(21) Appl. No.: 09/712,358

(22) Filed: Nov. 14, 2000

Related U.S. Application Data

(60) Provisional application No. 60/182,364, filed on Feb. 14, 2000.

(51) Int. Cl.
*G06Q 40/00* (2006.01)
(52) U.S. Cl. ..................... 705/36 R; 705/35
(58) Field of Classification Search ................ 705/36, 705/36 R; 345/775, 774, 962, 779
See application file for complete search history.

(56) References Cited

U.S. PATENT DOCUMENTS

| | | | |
|---|---|---|---|
| 4,774,663 A | 9/1988 | Musmanno et al. | |
| 4,823,265 A | 4/1989 | Nelson | |
| 5,132,899 A | * 7/1992 | Fox .............................. | 705/36 |
| 5,210,687 A | 5/1993 | Wolfberg et al. | |
| 5,214,579 A | 5/1993 | Wolfberg et al. | |
| 5,231,571 A | 7/1993 | D'Agostino | |
| 5,245,535 A | 9/1993 | Weiss et al. | |
| 5,262,942 A | 11/1993 | Earle | |
| 5,270,922 A | 12/1993 | Higgins | |
| 5,297,032 A | 3/1994 | Trojan et al. | |
| 5,692,233 A | 11/1997 | Garman | |

(Continued)

FOREIGN PATENT DOCUMENTS

JP         02005234614 A   *   9/2005

OTHER PUBLICATIONS

Friedman, J P, Dictionary of Business Terms, Third Edition 2000, "Ticker" p. 695.*

(Continued)

*Primary Examiner*—Charles R. Kyle
(74) *Attorney, Agent, or Firm*—Proskauer Rose LLP

(57) ABSTRACT

A browser interface for providing financial services is provided. The interface comprise a toolbar; a menu for presenting one of an application menu and a market data function menu; and at least one view window for presenting information from at least one of an application and a market data function. Also provided is a network based financial service system comprising a client computer having Internet access; a browser interface operable on the client computer, the browser interface having a toolbar, a menu for presenting one of an application menu and a market data function menu, and at least one view window for presenting information from at least one of a financial application and a market data function; and a server having access to a plurality of applications and a plurality of market data functions, the applications and functions being accessible from the browser interface of the Internet access. The interface and system provides timely, proactive financial advice. Users are afforded the opportunity to set and achieve investment goals based on real-time financial data and the ability to access financial applications.

7 Claims, 24 Drawing Sheets

U.S. PATENT DOCUMENTS

| | | | |
|---|---|---|---|
| 5,706,442 A | | 1/1998 | Anderson et al. |
| 5,710,889 A | * | 1/1998 | Clark et al. .................. 235/379 |
| 5,784,696 A | | 7/1998 | Melnikoff |
| 5,802,499 A | * | 9/1998 | Sampson et al. ............. 705/35 |
| 5,806,049 A | * | 9/1998 | Petruzzi ....................... 705/36 |
| 5,890,140 A | | 3/1999 | Clark et al. |
| 5,893,079 A | | 4/1999 | Cwenar |
| 5,913,202 A | | 6/1999 | Motoyama |
| 5,918,217 A | * | 6/1999 | Maggioncalda et al. ...... 705/36 |
| 5,930,774 A | | 7/1999 | Chennault |
| 5,933,816 A | | 8/1999 | Zeanah et al. |
| 5,940,809 A | | 8/1999 | Musmanno et al. |
| 5,946,666 A | | 8/1999 | Nevo et al. |
| 5,970,149 A | * | 10/1999 | Johnson ....................... 714/46 |
| 5,978,779 A | * | 11/1999 | Stein et al. ................... 705/37 |
| 6,064,984 A | * | 5/2000 | Ferguson et al. ............. 705/36 |
| 6,195,647 B1 | * | 2/2001 | Martyn et al. ................ 705/37 |
| 6,408,282 B1 | * | 6/2002 | Buist ........................... 705/37 |
| 6,484,151 B1 | * | 11/2002 | O'Shaughnessy ............ 705/36 |
| 6,681,211 B1 | * | 1/2004 | Gatto ........................... 705/36 |
| 6,709,330 B1 | * | 3/2004 | Klein et al. ................... 463/9 |
| 6,983,318 B2 | * | 1/2006 | Doyle ........................ 709/223 |
| 2002/0032632 A1 | * | 3/2002 | Sernet .......................... 705/37 |
| 2005/0154662 A1 | * | 7/2005 | Langenwalter ............... 705/35 |
| 2006/0041489 A1 | * | 2/2006 | Arnott .......................... 705/35 |

OTHER PUBLICATIONS

Degenhart C and Muehlbauer J, AOL in a Nutshell: A Desktop Guide to America Online, O'Reilly & Associates, 1998, pp. 285-290.*

* cited by examiner

FIG. 10C

Monitor Symbol Edit Page

| | | | | |
|---|---|---|---|---|
| INDU | Last ▷ | OEX | Last ▷ | |
| USH.Z | Last ▷ | TICK | Last ▷ | |
| VOLU | Last ▷ | VOLQ | Last ▷ | |
| UVOL | Last ▷ | DVOL | Last ▷ | |
| TIME | Last ▷ | PWJ | Last ▷ | |
| MWD | Last ▷ | CSCO | Last ▷ | |
| IBM | Last ▷ | INTC | Last ▷ | |
| NSCP | Last ▷ | GE | Last ▷ | |

Refresh: 30 secs ▷    Reset    Submit Syms

| | | | | |
|---|---|---|---|---|
| TRAN | Last ▷ | COMP.C | Last ▷ | |
| TICQ | Last ▷ | TRIN | Last ▷ | |
| T | Last ▷ | IDEC | Last ▷ | |
| UVOQ | Last ▷ | DVOQ | Last ▷ | |
| CCI | Last ▷ | BAC | Last ▷ | |
| COMS | Last ▷ | DELL | Last ▷ | |
| MSFT | Last ▷ | ORCL | Last ▷ | |
| FNM | Last ▷ | AXP | Last ▷ | |

PW Apps. User be00255 - Microsoft Internet Explorer

PaineWebber(R)
ConsultNet(SM)

Back | Forward | Refresh | Home | Internet | Exit | Print | SP

Research PW Apps. Market Data Client Inquiry InfoNet Online Portfolio Review InsightOne Horses Mouth Fin. Framework ...

— 221

Client Inquiry

Client Search — 250

Client Balance — 252

Select Account — 254

▼ — 256

Select View — 258

Activity

Unrealized G/L

Stmt Household

Insurance

Realized G/L

Value

— 204

Unrealized Account Gain/Loss

Account Name:  
FA: PREM HH RMA  
Return: Capital Appreciation   Risk: 1 Aggressive  
Date as of:  
Last Statement:

| Sym. | Security Desc. | Quantity | Current Value | Position Cost | Unr. G/L | %G/L | Cur. Price | Ave. Cost | Tax |
|---|---|---|---|---|---|---|---|---|---|
| Portfolio Totals: | | | 38,011,701 | 1,019,732 | 37,024,732 | 3630% | | | |
| All | Allstate Corp. | 1,574 | 37,6777.62 | 22,823.00 | 14,855 | 65.1% | 23.938 | 14.5 | 1 |
| APLX | Applix Inc. | 600 | 3,450.00 | 7,725.00 | -4,275 | -55.3% | 5.750 | 12.875 | 1 |
| AMAT | Applied Mater. | 16,000 | 1,446,000 | 232,992.00 | 1,212,008 | 520.6% | 90.375 | 14.562 | 1 |

Position: 1-3   Last Page   Get Full List   Update Prices

FIG. 12

| PW Apps. User be00255 - Microsoft Internet Explorer | — | ☐ | ✕ |

PaineWebber(R)
ConsultNet(SM)

| Back | Forward | Refresh | Home | Internet | Exit | Print | SP |

Research  PW Apps.  Market Data  Client Inquiry  InfoNet  Online Portfolio Review  InsightOne  Horses Mouth  Fin. Framework

212

PWERN    MORNING MEETING NOTES HEADLINES            PAGE 1 OF 197
FOR INTERNAL USE ONLY

APRIL 1, 1999

1  TECHNOLOGY: FIRST QUARTER WAS TOUGHER ON THE TECHS
2  POCHE: ANALYSTS MEETING MAINTAIN HOLD RATING WDR
3  BROADLINES RETAIL: MARCH SALES PREVIEW
4  ATLANTIC PICHFIELD: DOWNGRADE TO NEUTRAL
5  CBS AND KING WORLD MERGER PLANS ACCRETIVE TO FCF
6  NATGAS INSIGHT: ANOTHER PAINFUL HEATING SEASON ENDS
7  ICI: EARNINGS COULD POP ON MAJOP DEAL

ACCT AB12345          IE: TS CODE:V pAGE
S TEST A T
RETURN: CAP APPREC   RISK: 1 CNSERVATIVE 2. NONE SELECTED
L/A: T1 04/01/98
                                                                           +HS EXCESS
TYPE  TRADE DATE  BAL   SETTLE DATE  BAL   EQUIT  MKT VALUE  -HSCALS
1-CASH            -1.00              -1.00   1-         0        0

TOTAL           -1.00    SMA: 0
UNMRGN:         +0.00    BUY PWR: 0
MKT VAL:        +0.00    T2 EQUITY: 0%

TOTAL VAL:      -1.00    FED CALL: 0                 1-         0        0

BROWSER INTERFACE AND NETWORK BASED FINANCIAL SERVICE SYSTEM

CROSS REFERENCE TO RELATED APPLICATIONS

This application claims the benefit of U.S. Provisional Application No. 60/182,364, filed Feb. 14, 2000, entitled System For Providing Financial Services.

BACKGROUND OF THE INVENTION

1. Field of the Invention

The present invention relates to financial consulting; and more particularly, to a browser interface and client-server system for providing financial services.

2. Description of the Prior Art

Freedom to choose how to invest money is a cherished, time-honored right. However, a good portion of the investing public is confused about investing. As a result, many people tend to utilize a minimal number of investment vehicles, usually those with which they are familiar. Oftentimes, these modes of investment may not be appropriate for the investors' needs or ultimate goals.

Recognizing that they lack the basic principles of investing, some people turn to financial advisors for specialized investment advice. Typically, financial advisors utilize a number of disparate tools to formulate a discrete financial plan. These include financial planning calculators, review of historical market trends and yield calculations, and the like. In some instances, certain of these tools may be automated; others require manual use.

The financial industry has identified the need to automate financial services. For example, U.S. Pat. No. 5,132,899 discloses a computer data gathering and processing methodology that facilitates access to various data including investment performance, Securities Exchange Commission reports, and stock financial characteristics to produce a list of stocks for purchase for investment and operating accounts. U.S. Pat. Nos. 5,710,889 and 5,890,140 disclose a device and system for electronically integrating a plurality of financial services from different geographical locations and in different time zones.

There have likewise been developed a number of computerized financial advisory systems. U.S. Pat. No. 5,918,217 discloses a user interface which allows a user to interactively explore how changes in one or more input decisions, such as risk tolerance, savings level, and retirement age affect one or more output values such as the probability of achieving specified financial goals. Some of these tools are available over the Internet. At <<http://www.armchairmillionaire.com/fivesteps/intro.html>> there is provided an interactive savings tool which explores how to build a million dollar portfolio based on total dollar inputs.

In some instances, there have been attempts to integrate different automated financial tools. U.S. Pat. No. 5,245,535 discloses a system for demonstrating and displaying different financial concepts, which includes a central processing unit for processing financial information from numerical data and a display means for displaying the financial information in graphic and textual form. U.S. Pat. No. 5,214,579 discloses a data processing system that manages, monitors and reports the growth of a participant's investment base with respect to progress in achieving a predetermined target amount.

None of the patents or systems described above disclose a secure system having a myriad of integrated financial application and tools.

There accordingly remains a need in the art for an integrated system for providing financial services that can perform a number of different finance-related functions. It would be particularly useful if such a system could access real-time market data to provide timely financial advice. It would also be useful if this tool incorporated financial applications such as a financial planning application. The system would also be more useful if it had the ability to monitor and assist investor-mediated transactions in order to achieve predetermined financial goals. The integrated system would also be useful if it were capable of allowing a user to move between workstations at different locations while maintaining the application entitlements and preferences of their own computer, especially using the Internet to access a host server.

SUMMARY OF THE INVENTION

In accordance with the present invention, a browser interface for providing financial services comprises a toolbar; a menu for presenting one of an application menu and a market data function menu; and at least one view window for presenting information from at least one of an application and a market data function.

A second aspect of the invention provides a network based financial service system comprising a client computer having Internet access; a browser interface operable on the client computer, the browser interface having a toolbar; a menu for presenting one of an application menu and a market data function menu; and at least one view window for presenting information from at least one of an application and a market data function; and a server having access to a plurality of financial applications and a plurality of market data functions wherein the applications and functions are accessible from the browser interface via Internet access.

Advantageously, the interface and system of the present invention provide timely, proactive financial advice. Investors are afforded the opportunity to set and achieve investment goals based on real-time financial data as well as upon a number of other finance-related applications. In addition, the system may provide a user with the ability to monitor and assist in investor-mediated transactions.

The system of the present invention comprises stationary or remote computer hardware and specially integrated financial applications. Importantly, the integrated financial applications provide the system with the ability to process and view market data and research, provide financial planning, conduct transactions and monitor and assist investor-mediated financial activities. The ability to have a computer access the system using the browser interface over the Internet provides an advanced technology platform with a stable, fast operating environment, easy accessibility and usability, and the flexibility of remote computing.

The present invention also provides an authentication system for creating a browser interface. The authentication system provides means by which a user may access the financial service system from any computer with Internet access and retain all of the attributes of their own computer, i.e., application entitlement and user preferences.

BRIEF DESCRIPTION OF THE DRAWINGS

The invention will be more fully understood and further advantages will become apparent when reference is made to the following detailed description of the preferred embodiments of the invention and the accompanying drawings, in which:

FIGS. 10A–C are video screen displays illustrating a market data function menu feature;

FIG. 12 is a video screen display illustrating a client inquiry feature;

FIG. 20 is a video screen display illustrating the selection of a split screen display.

DETAILED DESCRIPTION OF THE PREFERRED EMBODIMENTS

I. System and Components
A. Software Overview
B. Browser Interface Overview
C. Authentication System Overview
D. Computer or Workstation
E. Host Server(s)
II. Software
III. Authentication System
IV. Browser Interface
A. Applications
B. Market Data
C. Research
D. Client Inquiry
E. InfoNet
F. Online Portfolio Review
G. InsightOne Web site
H. HorsesMouth
I. Financial Framework
J. Additional Browser Interface Features I. System and Components:

The present invention provides specially integrated tools for processing and viewing market data and research, providing financial planning, conducting financial transactions and monitoring investor activities. The advanced technology platform afforded by the present invention provides a browser interface, accessible over the Internet, to offer timely, proactive financial advice based on real-time financial data and a myriad of finance-related applications.

Figure 1:
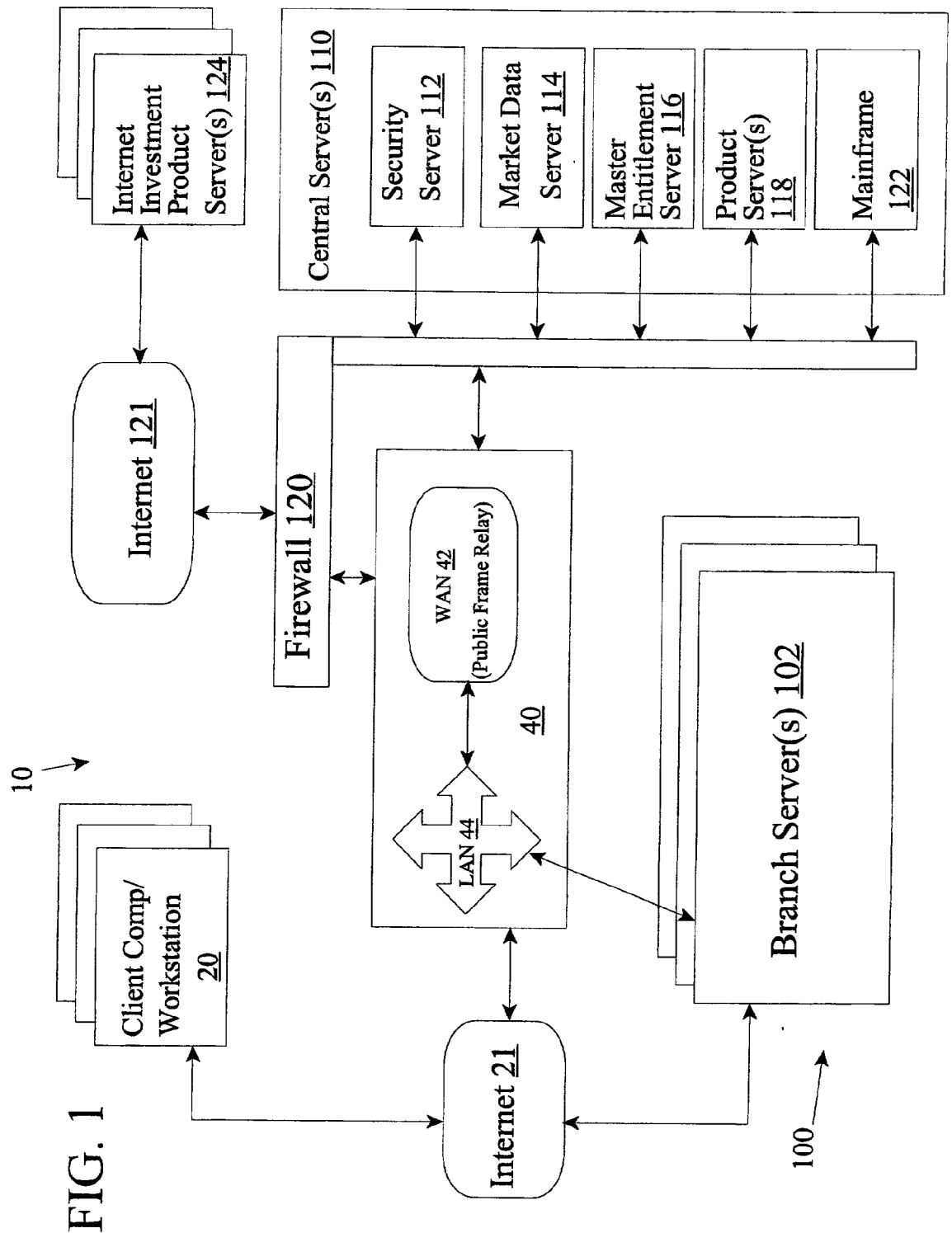
FIG. 1 is a block diagram of a network based financial service system.

Referring to FIG. 1, the present invention relates to a browser interface for providing financial services comprising a toolbar; a menu for presenting one of an application menu and a market data function menu; and at least one view window for presenting information from at least one of an application and a market data function. System 10 of the present invention comprises computer hardware that can be used in a stationary or remote environment and specially integrated software for the provision of financial services.

A. Software Overview:

Referring to FIG. 1, there is shown a financial service system 10 which incorporates a number of different software applications, functions and information content Web sites/pages, which, for purposes of this disclosure, are collectively referred to as 'objects'. For further purposes of this disclosure, an 'application' is software that provides a variety of calculations, and a 'function' is software that does not provide a large variety of calculations and may simply present data with minor manipulation, e.g., re-formatting.

In a preferred embodiment, system 10 includes a set of objects that can be used to process and view real-time market data and assist financial planning. Additional, preferred objects may be used to perform market research and monitor and assist in investor-mediated financial activities. Other objects used by system 10 preferably include browser-based interfaces for searching specific documents and related information; searching financial information; providing e-mail; providing mechanisms to search the Internet; and accessing annuity and mutual fund databases. In accordance with the present invention, investors are provided with high-quality, reliable advice. The stability, functionality, easy usability and flexibility of the integrated system of the invention provide timely, proactive advice and counsel, thereby furthering investor goals.

The objects may reside in part on any component server or database of host server 100, shown in FIG. 1, for access by a client computer or workstation 20 via the Internet.

B. Browser Interface Overview:

In a preferred embodiment, objects are integrated with a browser interface 200 (or controlled shell), shown in FIGS. 8A–21, in a manner that enables a user to view one or more graphical displays from a given object. Accordingly, system 10 provides a multitasking environment in which more than one application, function or Web site and/or page can be simultaneously run and/or viewed by the user. In this environment, an interface may have two or more windows, each representing a different object governed by its own protocols distinct to that object. The user can move between different windows, without having to constantly enter and exit each object of interest. Depending on the particular needs or questions of the user, appropriate objects can be accessed and utilized to generate financial information. For example, the user could request research on particular market sectors and specific equity positions within that sector. In a preferred embodiment, browser interface 200 is accessible from a workstation 20 via the Internet to access a plurality of financial applications and a plurality of market data functions. Real-time market data can be utilized in conjunction with financial applications in order to provide comprehensive financial assistance. In another instance, the user (i.e., financial adviser) may desire to monitor the activities of his or her client through an investor monitoring system. Here, the user could intercede in an order entered by the client or, alternatively, contact the client to discuss the ramifications of a particular order. Preferably, a scratchpad interface for moving information between the objects may also be provided.

C. Authentication System Overview:

The invention also may include an authentication system 80, shown in FIG. 4, described in detail further below. Generally stated, once communications to a host server have been established, a user logs onto system 10 and accesses authentication system 80, where the user enters a password and preferably, other authentication information such as a universal user name. This information is transmitted to a security system resident in host server 100 where a user is authenticated. This provides for confirmation of a user's identity. Concomitantly, user access is denied where authentication fails. The security functionality described herein also represents a single point of security control for adding or removing a user from the system 10. Preferably, the security system is resident in more than one component of host server 100 in order to provide load balancing and disaster recovery.

In addition, authentication system 80 also provides access to a user entitlement level containing a list of objects according to user entitlement. That is to say, different users are accorded different entitlement levels and as such, access to specific objects resident in system 10. For example, a sales person would not receive alerts regarding investor-mediated transactions and therefore would not be allowed access to those applications. Most preferably, a separate user entitlement level associates a user with specific market data.

In a preferred embodiment, the authentication system also contains a move/add/change (MAC) function 93 (FIG. 14) that updates the security function with new or changed user information. Preferably, the MAC function 93 updates the security function with new or revised user names, social security functions, unique advisor identification number (where appropriate), identification for market data entitlements, and satellite branch identifiers (where appropriate), as well as an e-mail alias and title. The MAC function 93 is a single entry point to fully add or remove a user from all required security or distributed systems that support platform functionality.

In addition, authentication system 80 accesses a user customized preference profile resident on the host server 100. The user preference profile allows a user to customize his or her browser interface and object settings, such as market data function preferences.

By providing the entitlement levels and preference profiles, the present invention allows a user to access system 10 entitlements via the Internet. In addition, the user retains all of his or her preferences set during a user's previous usage.

Figure 2:
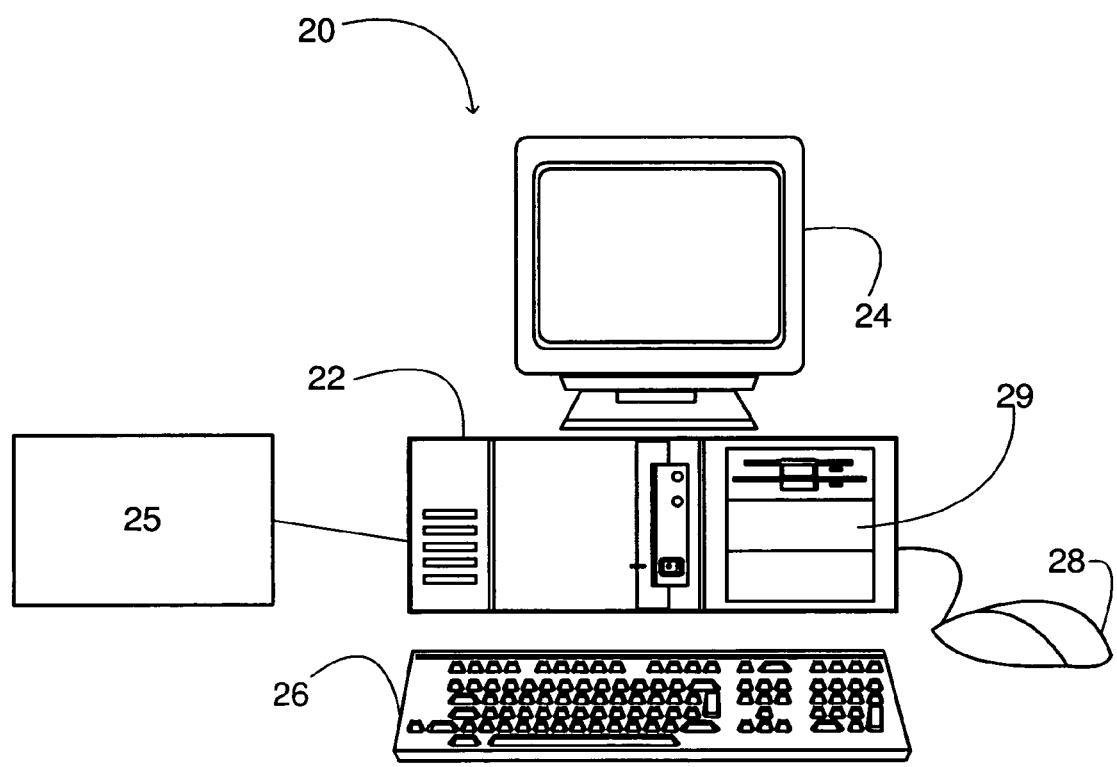
FIG. 2 is a schematic representation of a computer/workstation for accessing the system of FIG. 1 via the Internet.

D. Computer or Workstation:

A component of the present invention is a client computer or workstation 20 including Internet 21 access. (This differs from Internet access relative to firewall 120 only.) Workstation 20 can be used to review real-time market conditions, obtain research, assist financial planning, monitor financial activities, enter orders for the execution of security transactions, and conduct numerous other financial activities. Workstation 20 is fast, simple to use, and is readily adaptable to the needs of the user. As shown in FIG. 2, workstation 20 includes a central processing unit 22, a video display screen (VDS) 24, communication system 29 for communicating between workstation 20 and at least one host server 100 via the Internet 21, and a browser interface 200 (shown in FIGS. 8A–21).

VDS 24 is connected to a color video graphic controller card of workstation 20 and provides means by which financial information is displayed on VDS 24 in graphic form. Preferably, CPU 22 is housed in a single stationary or portable unit. CPU 22 of a stationary workstation 20 may comprise an IBM desktop personal computer with 96 megabytes of RAM, a 350 megahertz INTEL Pentium II processor, a 4.5 gigabyte hard drive, and a color video graphic controller card. Preferably, VDS 24 is a 17-inch color monitor with a screen resolution of at least 800×2000 pixels, such as those sold by Sony Corp. of America. As an option, a printer 25 may be connected to CPU 22.

A portable workstation may likewise be used with system 10. In one embodiment, the portable workstation comprises, for example, a laptop computer having at least a 166 megahertz INTEL Pentium processor, 64 kilobytes of RAM, and a screen resolution of at least 800×2000 pixels.

As mentioned above, workstation 20 also includes Internet access. To this end, communication system 29 includes a modem having a speed of 28.8 kilobytes per second (Kbps), although a modem speed of 56 Kbps is preferred. Of course, high-speed connections such as ISDN, cable modems, or digital subscriber lines may be used. Preferably, all data transmitted over the Internet is encrypted, e.g., with 128-bit encryption or like technology. Encryption ensures that account integrity will be maintained. It should be recognized that while the present invention will be described in terms of "Internet" communication, that more specific communication networks, such as a virtual private network or secured extranet, are considered to be within this realm. In any case, connectivity is preferably provided by conventional TCP/IP sockets-based protocol.

CPU 22 also includes mechanisms for selectively controlling the display of information on VDS 24 as well as devices for entering data into the system. Preferably, workstation 20 includes a keyboard 26 and a mouse 28 for entering information and directing the graphical display on VDS 24.

All of the hardware elements described herein may be readily replaced with other existing or later-developed elements that perform similar functions. For example, many different types of CPU's may be used instead of the unit described above. Likewise, touch screen displays, light pens, track balls, keypads, stylus-type input devices or any other input device may be used instead of or in addition to keyboard 26, mouse 28, or both.

Every workstation 20 is programmed with operating system software such as Windows NT® 4.0 from Microsoft Corp. Each workstation 20 may also contain a number of software applications. For example, workstation 20 may have a suite of applications from Microsoft Office® (i.e., Outlook, Word, Excel, PowerPoint), Norton Utilities®, various proprietary software for authenticating user access to the workstation, and non-proprietary finance-related applications. Each workstation 20 is also equipped with an Internet browser such as Microsoft's Internet Explorer®4.0 or greater, or Netscape Navigator. Alternatively, as will be discussed below, these applications may be resident on the host server and accessed as necessary via browser interface 200. The hardware and software framework described herein allows a user at any workstation 20 to access a host server 100 via the Internet, and utilize all available objects resident therein to which the user is entitled. In this way, system 10 can be used to provide superior financial assistance from remote locations.

E. Host Server(s):

In a preferred embodiment, the objects necessary to practice the present invention may reside a single server computer. However, as is evident from FIG. 1, system 10 preferably includes more than one server computer, which collectively are referred to as "host server" 100. Any number of workstations 20 may connect to host server 100 via the Internet 21. System 10 is preferably implemented in such a way as to optimize on infrastructure costs. Client workstations connect to the system from the Internet using Internet Explorer 4.x or greater. All server code utilizes Netscape Enterprise Server and Server Side JavaScript (LIVEWIRE). CISCO Distributed Director (which is utilized for Load-Balancing, Fail-Over and Disaster Recovery) controls access to product server(s) 118 from referencing the Universal Resource Locator (URL). As will be discussed in greater detail later, user authentication is accomplished via authentication processes run against the master entitlement server 116. User entitlements and permissions are achieved through access to the master entitlement server 116, using profile information gathered from the authentication process. For the purpose of this disclosure, master entitlement server 116 may comprise one or more servers; for example, an authentication server for user authentication and an entitlement server for establishment of user entitlements and permissions. Other preferable tools which are maintained in host server 100 are built in JAVA and are resident at browser interface 200. These include 1) a navigation bar feature which provides for "closed browser shell" navigation to all entitled applications; 2) a scratchpad feature which provides for application to application "stickiness" or context (e.g., carries information such as a symbol or account number from application to application without re-entry; and 3) a customized application built around IBM's Host On Demand (HOD) 327× emulation which provides for the establishment of a user entitlement based NAVIGATION TREE. Market data information is built using JAVA-based web pages from data accessed on market data server 114 as well as any other market data servers not shown in FIG. 1, such as those maintained as part of branch server 102, using user profile information supplied from the navigation feature. System 10 utilizes identical central server 110 components to the system described in the co-pending application entitled "System for Providing Financial Services."

II. Software

The only software necessary to practice the present invention on Workstation 20 is an Internet browser such as Microsoft's Internet Explorer and any Internet access software required, e.g., Internet service provider dial up software. Workstation 20 accesses host server 100 via Internet 21 either by accessing branch server 102, which in turn may access other components of host server 100, or via centralized communication system 40. Objects are provided over Internet 21 from host server 100 to workstation 20, as described below.

Figure 3:
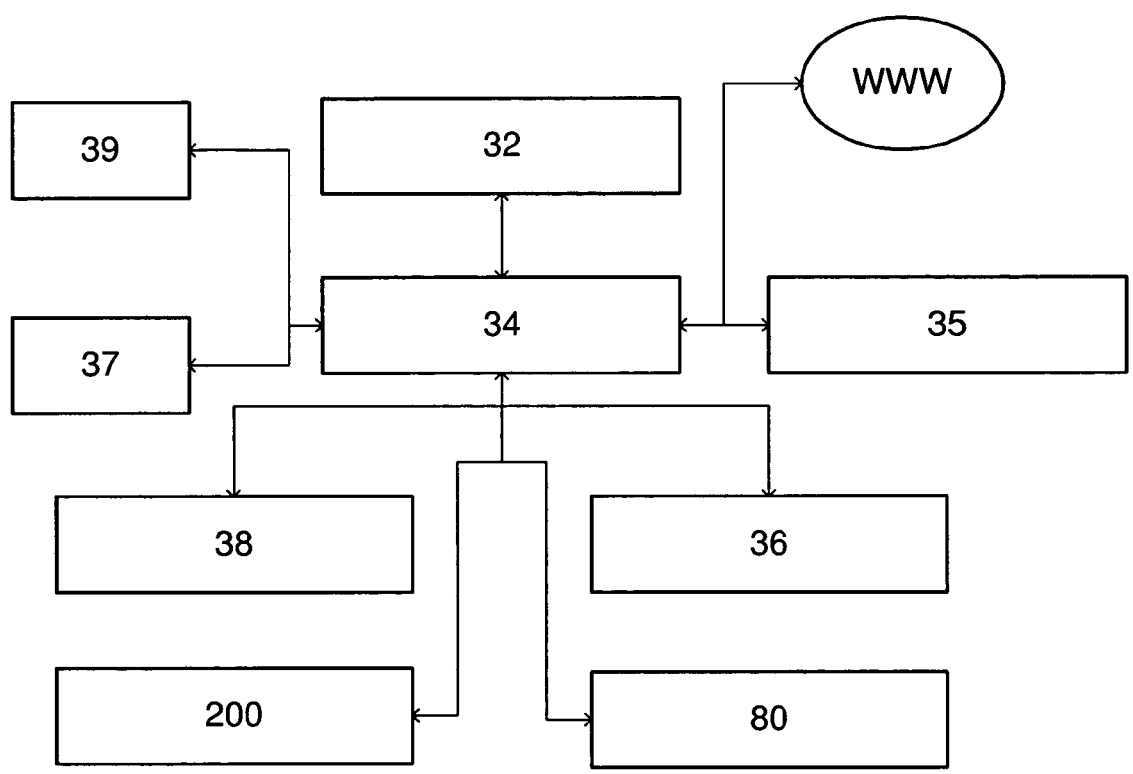
FIG. 3 is a block diagram of the software hierarchy of a host server of the system.

Referring to FIG. 3, a software hierarchy of host server 100 is shown. At the lowest level of the software hierarchy, operating system software 32 is provided. Preferably, operating system software 32 is a Windows NT® 4.0 operating system from Microsoft Corp. As well known by those having skill in the art, operating system software 32 causes the hardware components to operate in combination with one another by accepting input data, processing input data, and producing output data.

Conventional communications software 34 runs on top of operating system 32. This software permits user interaction with a keyboard, mouse or similar input device of host server 100 to control the operation of the software and other applications resident on the host server 100. It also serves as a means for transmitting information between the components of host server 100. As indicated in FIG. 3, communications software 34 is also linked to the Internet access 33, which accesses Internet 121 through firewall 120. Due to firewall 120, Internet access 33 of host server 100 allows a user to more securely conduct search via system 10 for investment information, background information, breaking news that affects investments and the like. Internet access 33 also allows a user to communicate with other users through system 10 and with clients via e-mail packages such as provided by Microsoft Outlook. This provides means to access the Internet, send e-mail, search at least one browser-based information system, etc.

Browser interface 200 and authentication system 80 are applications running on top of operating system software 32. The function and details of these applications are discussed below.

As shown in FIG. 3, communications software 34 is also preferably linked to various objects that may be categorized, for convenience of description only, as a plurality of market functions 38, a plurality of applications 36 (preferably financial applications), and a plurality of additional objects 35. These objects will be discussed in more detail relative to browser interface 200 below.

In accordance with the present invention, system 20 can contain an unrestricted number of different applications, functions and Web sites/pages. Furthermore, system 10 may include any other software 39 (FIG. 3) necessary for operation. It should be recognized that while objects are described as being "on" system 10, they be either physically located on a server or database of system 10 or may be accessed (e.g., via Internet 121 through a firewall 120) from third party service providers, e.g., Internet investment product server(s) 124.

III. Authentication System

Referring to FIGS. 4–7, an authentication system 80 of the invention is shown in greater detail. Authentication system 80 allows a user to access objects by user entitlement and access a user preference profile for that user regardless of where a workstation 20 is physically located.

Users are provided with an object suite pre-determined user entitlement level. A user's entitlement level may be determined by their functional position, e.g., financial advisor, client service associate, operations manager, branch office manager, and division manager. Objects can be added or deleted to a user entitlement level as necessary. All security updates, new user, objects, adds or changes, may require secondary approval, before they are processed. It should be recognized that while the description discusses a single user entitlement level, more than one entitlement level may exist for a user, e.g., one for market data functions and another for applications.

Authentication system 80 uses the user's entitlement level to build browser interface 200 for a user. A user entitlement level is stored in an entitlement database(s) within system 10 and may include a number of identifications or passwords for the user, e.g., universal user name (UUNAME) including, for example, parent branch wire code (2 digit unique branch designation) and a Quotron® user identification (QID). A customized user preference profile is also stored in a distributed/shared file space (DFS) which is preferably maintained within master entitlement server 116 of system 10 and contains customized settings of a user, e.g., user network registry settings for preferencing directories and files, taskbar settings, etc. A user's preference profile will be used to build browser interface 200 and provide the user with preferences that he or she has previously set.

Authentication system 80 also preferably includes a move/add/change (MAC) function 93 (FIG. 4), which provides a single point of control for all updates to user preference profiles, which in turn perform synchronous updates to all required security platforms, directories, entitlement and permission database, market data entitlements (e.g., QID), all e-mail account information for simple mail transfer protocol (SMTP) or Microsoft Exchange based e-mail services, and all printer account information. MAC function 93 provides for distributed administration of client accounts. For example, each branch preferably has a designated MAC staff member who, via MAC function 93, has the permission to update user entitlements for those users that access system 10 from Internet through their respective branch server 102. This distributed updating is a significant advantage to the overall operation of the platform because a local administrator can administer local staff. If desired, changes may require secondary approval, for instance, by a branch manager, thereby maintaining tight security control of this distributed function.

Figure 4:
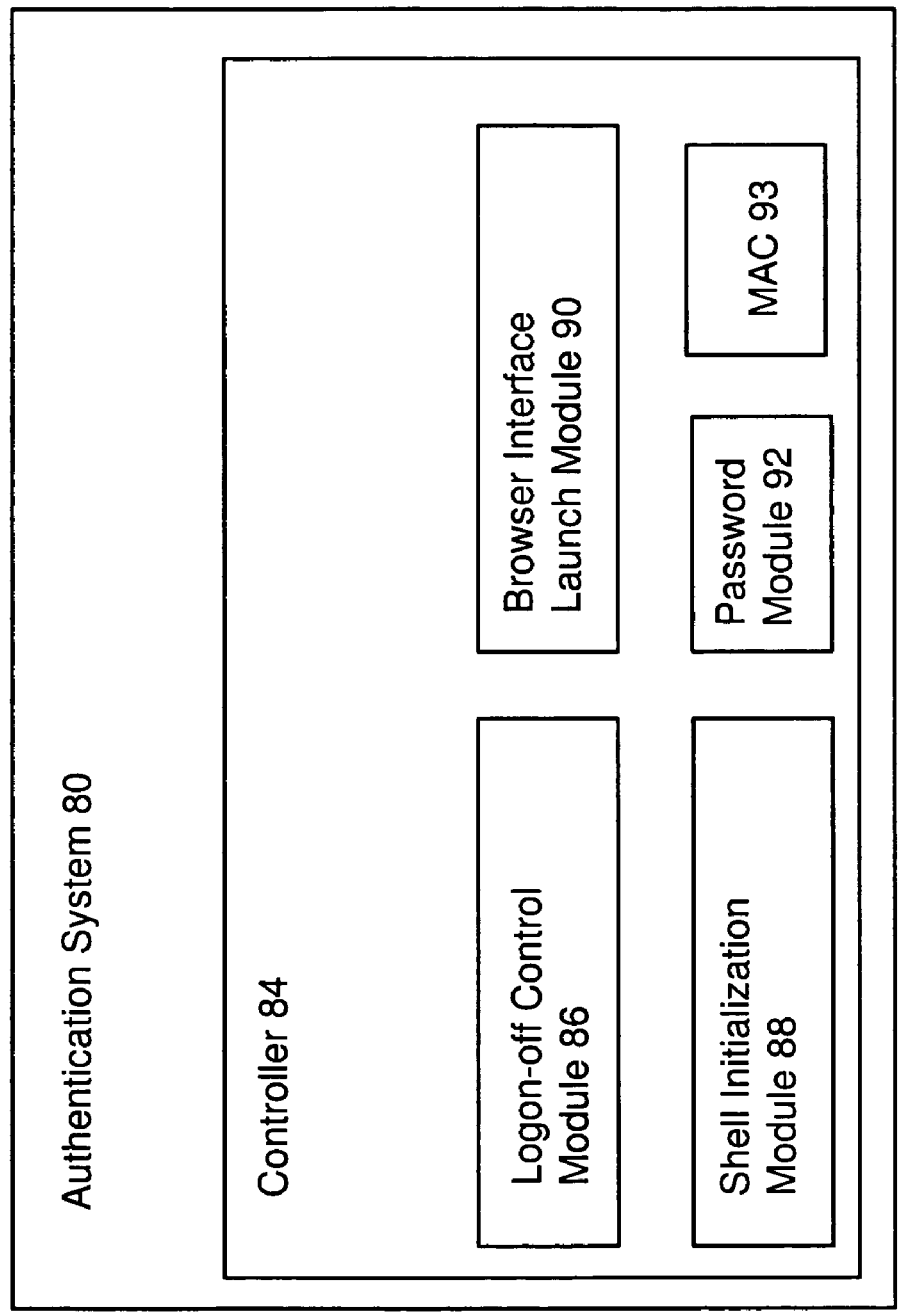
FIG. 4 is a block diagram of an authentication system.

As shown in FIG. 4, authentication system 80 includes a controller 84, a logon-off control module 86, a shell initialization module 88, a browser interface launch module 90, a password module 92 and MAC function 93. Operation of authentication system 80 will be described relative to FIGS. 5–7. It is also noted that authentication system 80 will be described relative to a host server 100 having multiple components. While authentication system 80 is preferably used in a distributed server system, it should be recognized that the servers described might be condensed into a single server.

Figure 5:
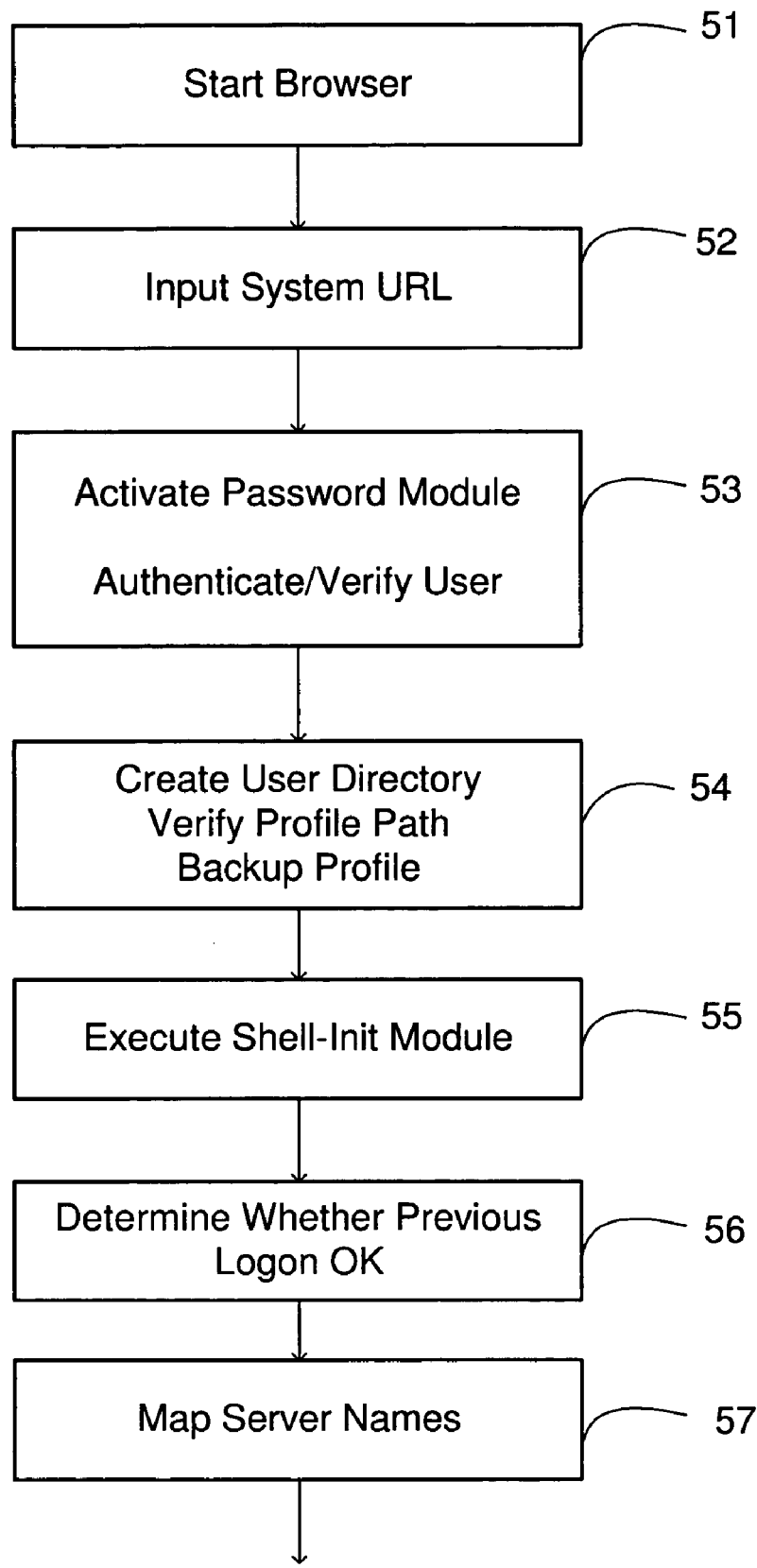
FIGS. 5–7 are flow diagrams of operation of the authentication system.

Referring to FIG. 5, in a first step S1, a user starts a workstation 20 and starts an Internet browser thereon, which accesses the Internet 21 in a known fashion.

In step S2, a user inputs a uniform resource locator (URL) into the browser on their workstation 20 that will access an appropriate server of system 10. When the system 10 is accessed, controller 84 activates logon-off control module 86, which oversees the logging in process.

As will become evident, controller 84 (sometimes through modules 86, 88, 90, 92) governs a number of activities including retrieving a user's preference profile, populating browser interface 200, finding a user's entitlement level, retrieving numerous user identifications (e.g., parent branch wirecode, market data server ID, outside Internet investment product server ID and security ID for use by shell initialization module 88), creating a local user directory based on a user's preference profile, storing user password(s) in a library for objects to retrieve, setting an access control list on a logging in user's directory to provide full control, verifying and backing up user preference profiles, removing local preference profiles (excepting defaults, administrative and guest settings), and notifying a user of password expiration.

Next, at step S3, controller 84 authenticates a user logging on by activating password module 92. Password module 92 may access a special security server 112 (FIG. 1) of central server(s) 110 to authenticate a user. Upon initialization of security server 112, a user will be presented with a dialog for input of a user name and password (shown in FIG. 8A). Controller 84 may also indicate that a password change is required, i.e., it is about to expire based on information from security server 112. At this time, the MAC function 93 notifies the user that a password-reset operation has been performed and the password must be changed. The password may be changed in any conventional way of inputting a new password with a confirmation.

At step S4, controller 84 creates a local user directory, verifies that a user preference profile path exists and backs up the user preference profile. A user preference profile may exist on a branch server 102 or another server within system 10. A user preference profile includes a number of directories and files of the user, called a registry, that are used by system 10 to access a user's information. If controller 84 cannot verify a path, authentication system 80 uses a default profile. If a registry fails to load for a user, controller 84 may attempt to use a user's last known profile, which may be accessible from a back up of the profile. Creating a local user directory on workstation 20 includes mapping the directories of workstation 20 to the registry of directories and files for a user.

At step S5, after a user is authenticated, logon-off control module 86 executes shell-initialization module 88 (hereinafter "shell-init module").

At step S6, shell-init module 88 determines whether a previous logon did not proceed normally. If this is the case, shell-init module 88 undoes the changes made during last logon, i.e., it remembers user preference profile changes made during the previous logon.

At step S7, shell-init module 88 maps server names for user information to server IP address and port number. Since the user is accessing system 10 via the Internet, the system recognizes the user as being at a remote site.

For authentication purposes, shell-init module 88 is directed to a cluster of central authentication servers. In particular, user entitlement level and user preference profile are attained from the user's branch server 102 or a master entitlement server 116 of central server(s) 110. Preferably, shell-init module 88 will point to the branch server 102 to which the user preferably logged in to attain a user entitlement level and user preference profile. If this information is unavailable, shell-init module 88 will point to the master entitlement server 116 to attain a user entitlement level and user preference profile. Shell-init will always point to branch server 102 for, e.g., financial adviser specific client data, SMTP e-mail, etc.

Figure 6:
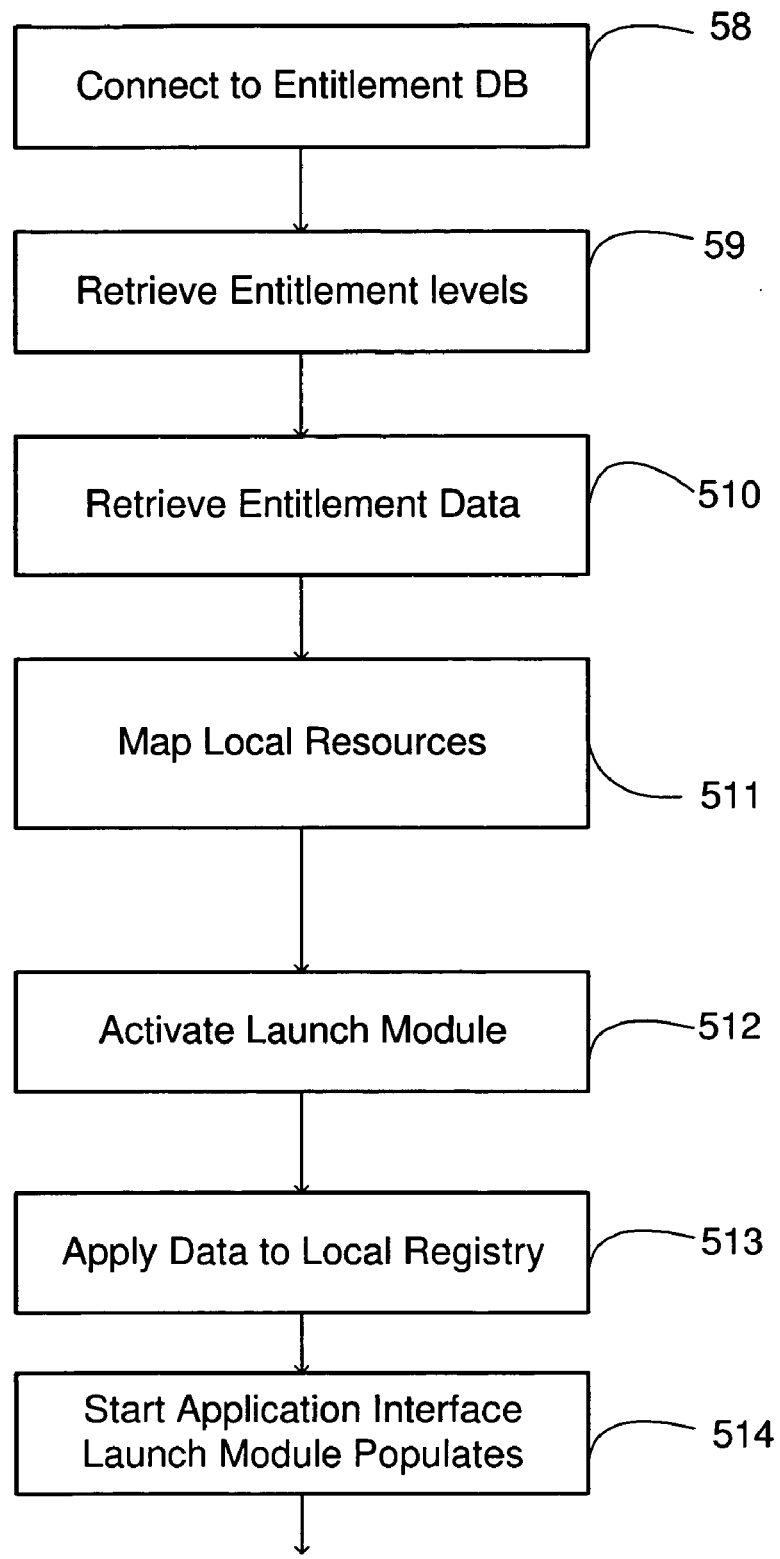

Next, turning to FIG. 6, at step S8, shell-init module 88 connects to an entitlement database, located on a server within system 10. Access to user entitlement level is based on the user identity input at authentication. Shell-init module 88 attempts first to access a user's branch database 106, which includes an entitlement database, to determine this information. If unable to do so, system 10 has a failover to a central server 110 master entitlement database maintained in master entitlement database 116. The master entitlement database includes duplicate entitlement databases to those in the branches.

Next at step S9, shell-init module 88 retrieves a user's entitlement level. In particular, shell-init module 88 retrieves a list of user identifications for accessing objects from system 10. These identifications are stored for use by browser interface 200.

At step S10, shell-init module 88 logons onto an appropriate server, e.g., branch server 102 or central server 110, and retrieves entitlement data. Shell-init module 88 secures registry entries for browser interface 200, attains a user control list, a batch file for interface launch module 90, and a user's parent branch wire code.

Next at step S11, shell-init module 88 maps a user's workstation local resource drives to a user's directories/files, i.e., distributed file system (DFS), by reading from the user's preferences and substituting variables with wire codes, branch groups and user names as appropriate. DFS may be located in any of host server 100 component servers.

At step S12, shell-init module 88 activates browser interface launch module 90, which runs throughout a user's session. Interface launch module 90 builds browser interface 200 from a user's standard browser, and handles security ticket expiration, user logoff and workstation 20 restorations. With special regard to security ticket expiration, launch module 90 continually monitors a security time ticket and gives a warning to a user when time is about to expire. This functionality is provided by querying password module 92 to determine what time allotment a user may have.

Next at step S13, launch module 90 applies the entitlement data to the local workstation registry, i.e., it removes the local preference profile of the workstation and/or browser the user is using. Thereafter, launch module 90 signals controller 84 to start browser interface 200.

At step S14, controller 84 starts browser interface 200, and launch module 90 populates the user's browser with the user's entitled objects and any other ancillary processes. During this time, launch module 90 retrieves path names of executables to launch from the registry. Some objects execute and are monitored, some execute but are not monitored, and some execute at logoff. These are monitored by launch module 90 so appropriate action may be taken.

Figure 7:
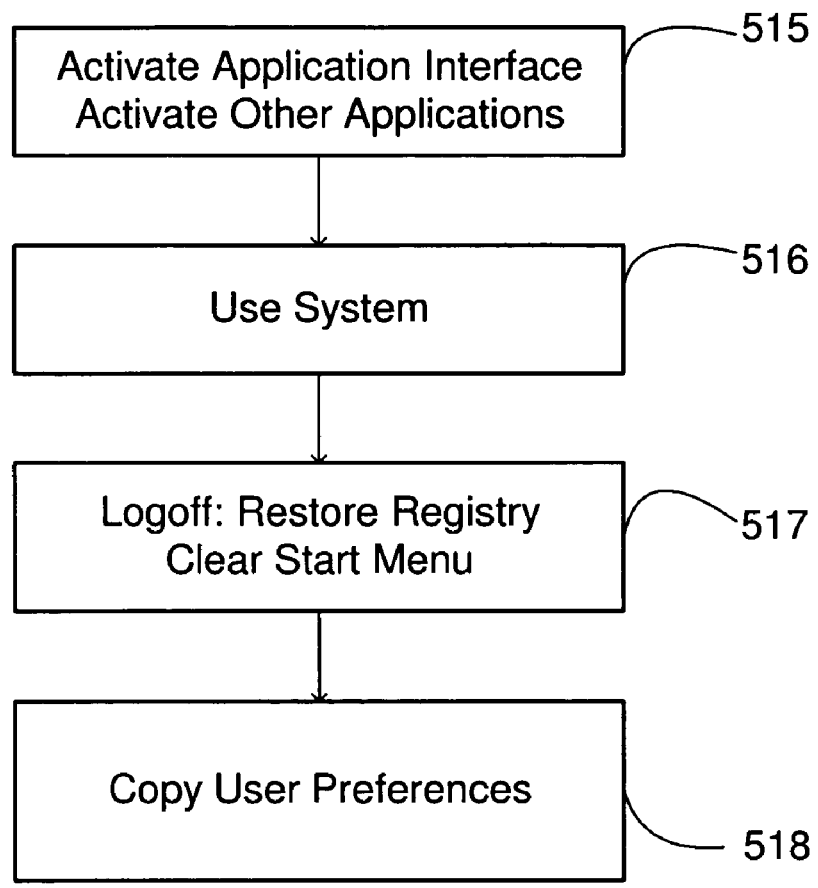

At step S15, shown in FIG. 7, launch module 90 activates browser interface 200, which in turn activates all other objects according to a user's entitlement data.

At step S16, the system is used to conduct various finance-related activities such as advising investors, conduct exchanges on behalf of an investor, chart investment progress, or the like. In this way, the user can provide the investor with timely, proactive financial advice. Launch module 90 monitors a user's time versus a security ticket expiration and notifies a user when his or her time is about to expire. The notification may provide a user with the ability to extend the ticket, otherwise, the user will be forcibly logged off.

At step S17, a user logs-off the system, at which time launch module 90 restores the workstation registry entries that were in place prior to the user's sessions and clears the user's browser.

At step S18, controller 84 copies a user's preferences from local cache to the location from which it attained them as appropriate so a user's changes can be accessed the next time the user logs on.

The authentication system 80 thus described allows a user to access objects according to entitlement level and provides a user preference profile for that user regardless of where a workstation 20 is physically located. As such, the system 80 allows a user to log-on from any Internet accessible computer or workstation 20 and have all of the objects, directories/files and preferences available as if they were at their own workstation.

IV. Browser Interface

FIGS. 8A–21 illustrate a browser interface 200 of the invention. Using browser interface 200, a user may access system 10 in a completely Internet-based environment. In this environment, a user may access objects such as those outlined above in section II (i.e., as shown in FIG. 3, a plurality of applications 36, a plurality of market functions 38, and a plurality of additional objects 35), from any personal computer or workstation 20 having Internet access. The ability to have a user access they system using a browser interface 200 provides an advanced technology platform with a stable, fast operating environment, easy accessibility and usability, and the flexibility of remote computing.

Advantageously, browser interface 200 provides a seamless transition between the different objects afforded by system 10 of the invention. The objects available are determined by a user's entitlement level as described above relative to authentication system 80. Browser interface 200 thus acts as a "controlled shell" of objects for a user in that only objects that a user is entitled to are provided to him or her. Based on the type of financial assistance desired, the user selects the appropriate application(s), function(s) or Web site(s)/page(s) for use. In accordance with the particular user selection, system 10 opens and/or connects to the selected object(s) and the user is able to view the object(s) at workstation 20 through his or her browser interface 200. Object data displayed may be from any component server of host server 100, i.e., branch or central servers. Access to Internet investment product server(s) 124 or any other outside source that requires heightened security, may be accessed (or filtered) through firewall 120 from the Internet 121 (FIG. 1).

As discussed above relative to system 10, where a user is connected to a host server 100 via the Internet 21, connectivity is provided by conventional TCP/IP sockets-based protocol. In this network-based system, a workstation 20 may be any computer, stationary or portable as described above, that has Internet access such as an Internet service provider outside of the system 10 to establish connectivity to host server 100 of system 10. In this environment, all data is preferably encrypted, e.g., with 128-bit encryption techniques, to ensure account integrity will be maintained.

Referring to the details of FIGS. 8A–21, an exemplary browser interface 200 is described. It should be recognized that the particular objects disclosed may vary depending on a users entitlement level. Furthermore, the particular appearance of browser interface 200 may vary according to a user's preference profile, e.g., each user's toolbar may have buttons in different positions, have different objects viewable from a menu, etc.

Figure 8A:
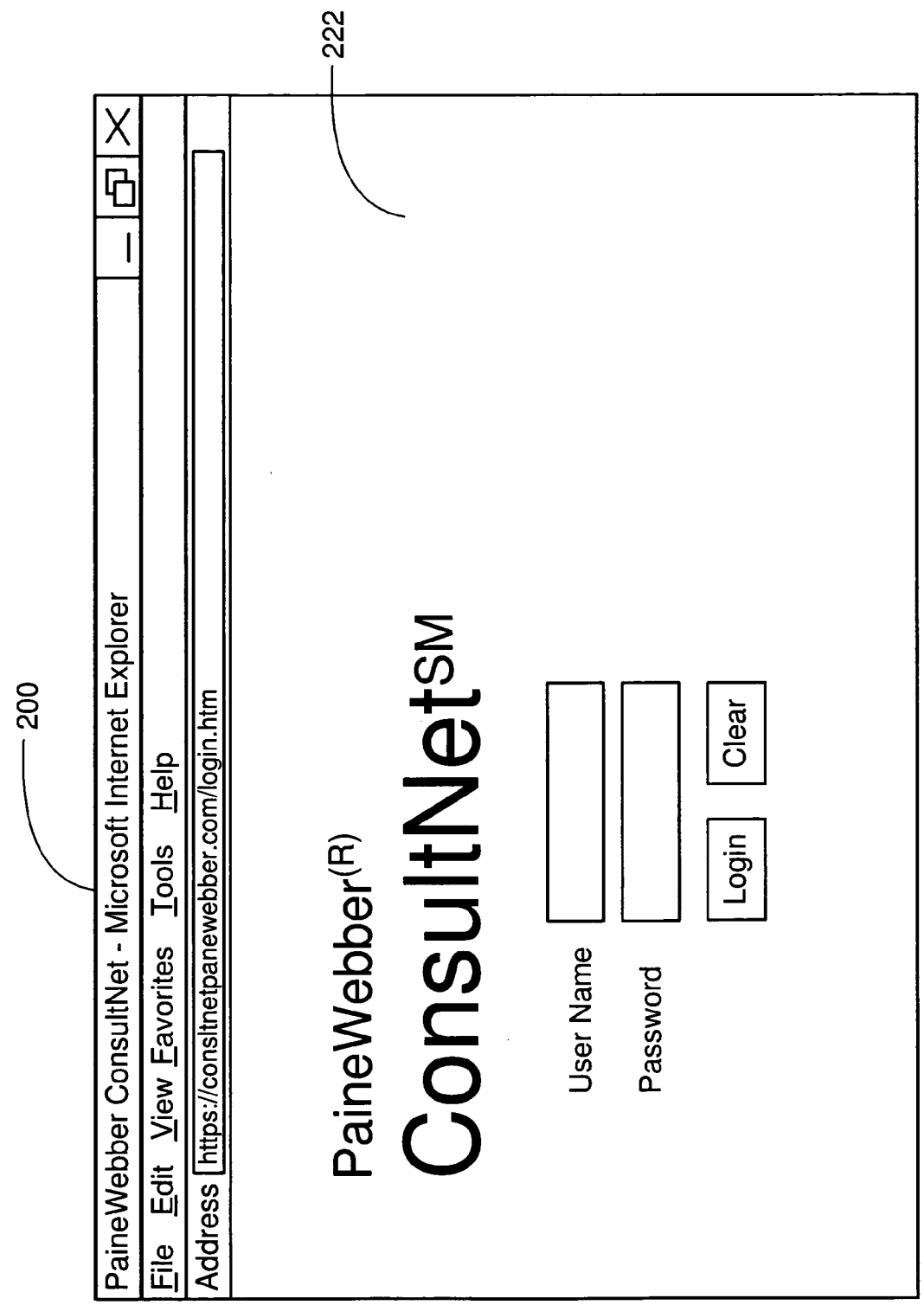
FIGS. 8A–B are video screen displays illustrating an authentication login and start window of a browser interface, respectively.
Figure 8B:
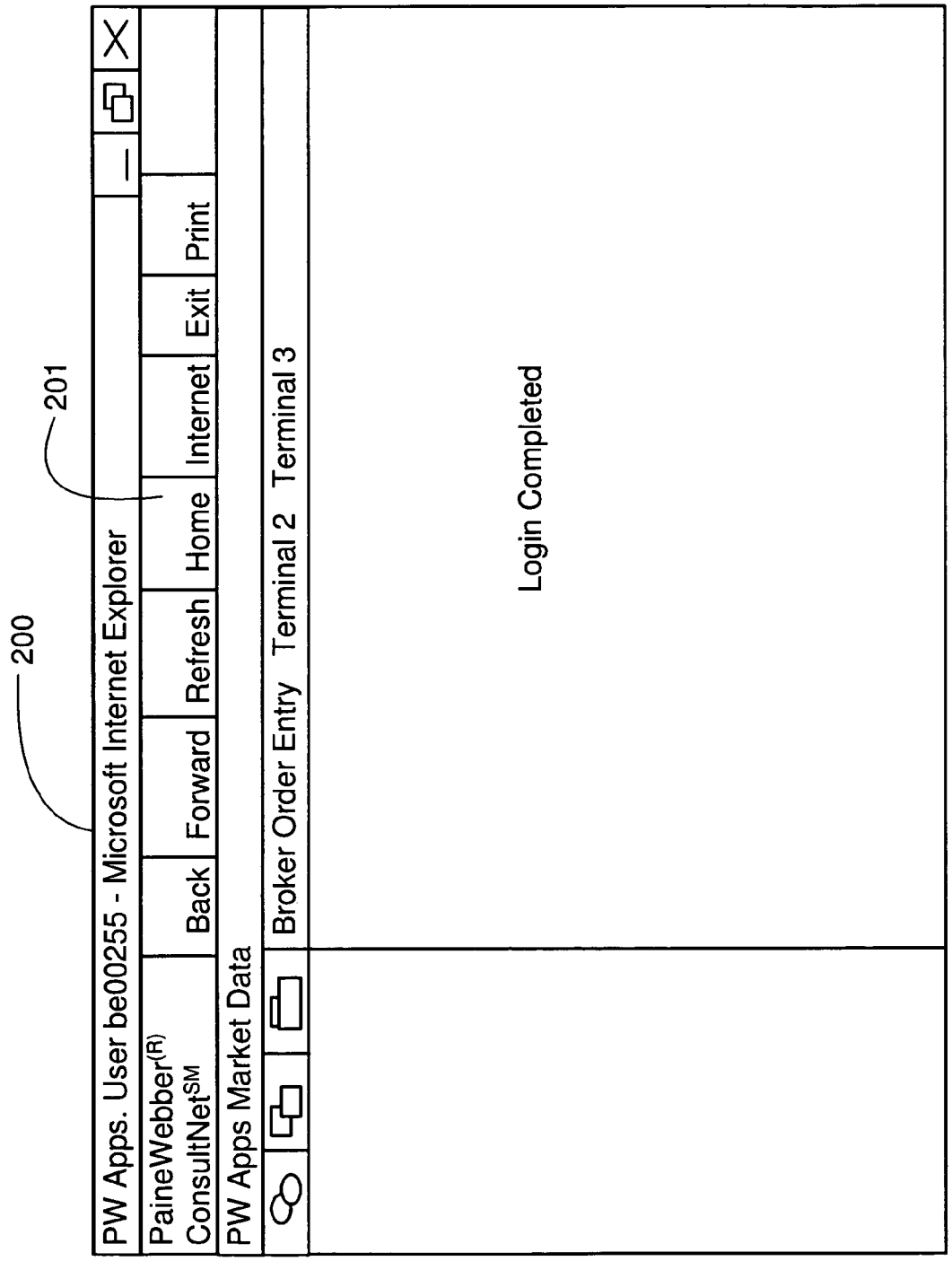

Referring to FIG. 8A, an authentication login 222 is displayed on a user's browser. Login 222 is presented to a user upon accessing system 10 by inputting an appropriate URL in the user's browser, and is operable with authentication system 80 of system 10, as discussed above, to allow a user to enter system 10 using his or her user name and password. Where a successful logon has been completed, the user is presented with a browser interface start window 201 such as the simplified screen display of available feature shown in FIG. 8B. As used herein, the interface 200 shown in FIG. 8B is a simplified version to that shown in FIGS. 9–21 and is not representative of the complete functionality of browser interface 200. "Features" for purposes of this disclosure are convenient object categorizations or browser functionalities that a user may select from browser interface 200. Each feature may include a number of objects, i.e., applications, functions or Web sites/pages, for further selection. The details of particular features will be described relative to FIGS. 9–21.

Referring to the more detailed FIGS. 9–21, a browser interface 200 includes a toolbar 202, a menu 204 for preferably presenting one of an application menu 206 (FIG. 9) and a market data function menu 210 (FIG. 10A), and at least one view window 212, 213, (FIG. 10A) for presenting information from at least one of any application and a market data function.

Toolbar 202 may include standard browser features such as back, forward, refresh/reload, home and print. Additionally, toolbar 202 preferably includes an Internet selection 214 and exit selection 216. Internet selection 214 allows a user to access the Internet in general for common search engine searching of the World Wide Web. For example, a user may conduct searches for investment information, background information, breaking news that affects investments and the like on search engines as Yahoo and Excite. General Internet access also allows a user to communicate with other users and with clients via e-mail packages such as provided by Microsoft Outlook. This provides means to access the Internet, send e-mail and search at least one search engine. If necessary, access to the Internet 121 may be filtered through firewall 120 of system 10 for added security. Exit selection 216 allows a user to successfully logoff of system 10.

Toolbar 202 also preferably presents at least two feature selections 218, 220 for accessing a variety of object menus and individual objects. In a preferred embodiment shown, at least two selections are possible; namely, an application selection 218 for accessing an application menu 206, shown in FIG. 9 of a plurality of applications 36 (FIG. 3), and a market data selection 220 for accessing market data function menu 210, shown in FIG. 10, of a plurality of market data functions 38 (FIG. 3). Other feature selections may include menus for accessing a plurality of additional objects 35 (FIG. 3) such as research selection 219, client inquiry selection 221, InfoNet selection 223 (a proprietary web-based information network), online portfolio review selection 225, InsightOne Home Page (Web site) selection 227 (a non-discretionary client brokerage program), HorsesMouth selection 231 (a third party content provider), and financial framework selection 233 (a financial planning application). Additional feature selections may be accessed by selecting "more. . . ". The toolbar 202 also preferably includes a scratchpad application selector 207, which serves to maintain focus on accounts or positions by moving information between objects of system 10. Accordingly, scratchpad 207 relieves the user from having to continually re-enter data. Although preferred toolbar features have been disclosed, it should be recognized that any number of additional features and/or selections might be added in a known fashion as desired.

Using feature selections 218–221, 223, 225, 227, 231, and 233, a user may select the application, function or Web site/page presented by browser interface 200. Upon activation of any selection, browser interface 200 normally provides a menu 204 of possible objects available for the particular selection. Upon selection of a feature, a base object for the feature may also be immediately displayed in at least one view window 212. If the feature activated does not contain a number of objects, thereby requiring a menu, the view window 212 may immediately display the selected object. Each entry in a menu 204 can be a hypertext link to an object having information for display or a link to a menu 205 of sub-items, e.g., as shown for products & investments in FIG. 9. Selection of a particular object from a menu 204, 205 will force activation and/or display of the selected object in at least one view window 212 adjacent to menu 204.

Figure 9:
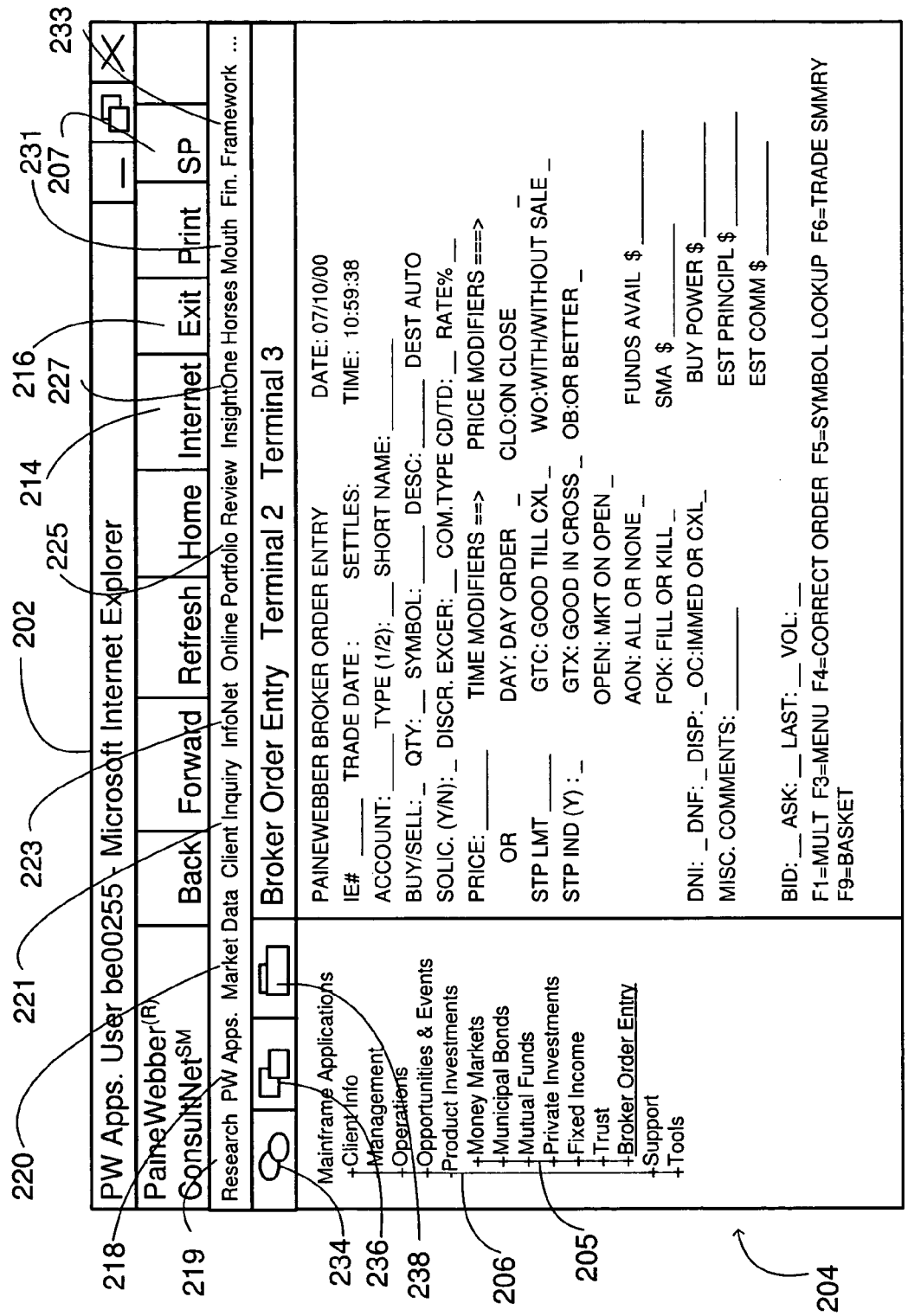
FIG. 9 is a video screen display illustrating a browser interface and, in particular, an application menu feature.
Figure 10A:
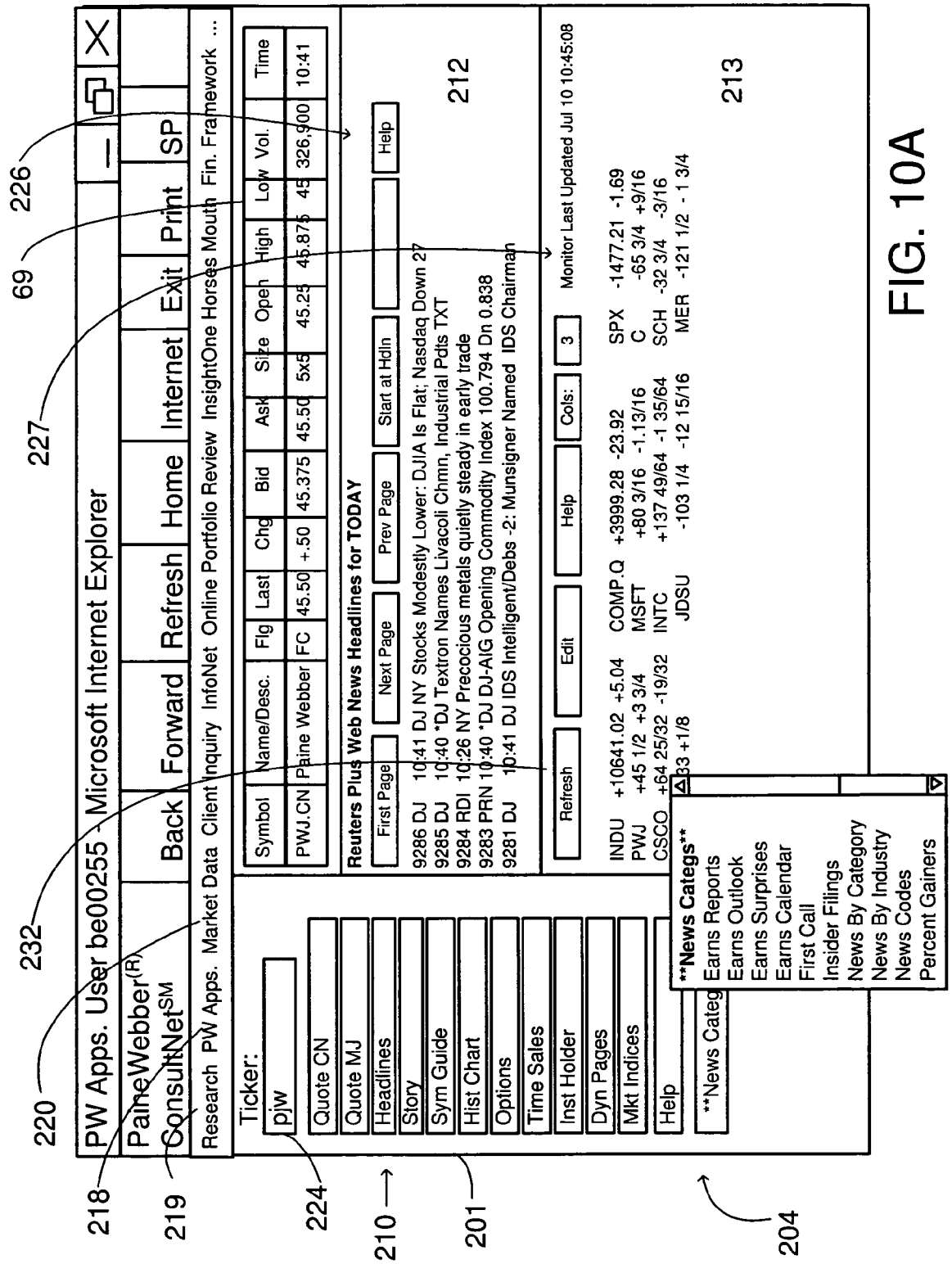

As shown in FIG. 10A, more than one view window 212, 213 may be displayed at one time by selecting split screen function 236 (FIG. 9) and activating multiple objects. For instance, in FIG. 10A, a first view window 212 displays a market data headlines view function 226, while a second view window 213 displays a market data monitor list function 227. Similarly, one view window 212 may display a market data function, while a second view window 213 displays a financial application. Every view window 212, 213 may include conventional scroll bars as necessary.

While objects are generally available only through their respective object feature selections, it should be recognized that certain objects may be accessible from numerous points within browser interface 200. For example, a financial planning application (FIG. 17) may be available through application feature 218 or financial framework selection 233.

The following description sets forth exemplary features of browser interface 200 such as applications 36, market data functions 38, additional objects 35, a particular application for financial planning (FIG. 17) and additional browser interface features (FIGS. 8B, 9 and 18–21). Applications will be discussed relative to FIG. 9 and market data functions relative to FIGS. 10A–B. With special regard to the additional objects, preferred members may include research objects for researching investments (FIG. 11); client inquiry objects for investigating client accounts, positions, and the like (FIG. 12); a browser-based information network that provides proprietary product and administration information (FIG. 13); online portfolio review objects for preparing reports on client accounts and the market (FIG. 14); InsightOne objects (FIG. 15); and a HorsesMouth object, previously described as a third party content Web site/page (FIG. 16).

A. Applications:

FIG. 9 shows an exemplary application menu 206 of a plurality of applications that is proved upon activation of the application feature selection 218. Applications generally provide investor account data, online statements, transaction confirmation, IRS 1099's, investor account information, portfolio management, TFI and MUNI inventory, security cross references, and the like. Application menu 206 selections may include client information applications, management applications, opportunities and events applications, products and investment applications, support applications, and tool applications. Each selection may include a drop-down menu 205 of sub-selections. For instance, product and investment sub-selections include money markets, municipal bonds, mutual funds, private investments, taxable fixed income, unit trust and broker order entry. FIG. 9 shows a broker order entry application in view window 212 that has been selected from application menu 206.

Exemplary sub-selections for some of the application selections may be as follows:

Client info: account inquiry, householding of a family or related accounts, online client services, portfolio management, client contact and portfolio information, security cross reference, stock records, 1900 system, client database, client and account review, client statement system, dividend reinvestment, late pay-margin interest, managed account billing, client account balances (i.e., MoneyLine), and financial framework (a financial planning application).

One particular 'client info' application is an investor monitoring system which allows a user such as a financial adviser to monitor specified investor accounts and activity, e.g., online investor transactions, and allows the user to monitor and participate in investor-mediated transactions on a real-time basis. For instance, after tracking an account activity, a user may send e-mail to a client and make recommendations. Further, a user may place orders and conduct other transactions for a client via applications menu 206, e.g., placing an order as shown in FIG. 9. Here, host server 100 is linked via conventional communications channels to a system for investor trading such as an online transaction forum, or some other investor transaction system such as a telephone-assisted investment forum. In such instances, host server 100 receives real-time communications regarding investor-mediated transactions. These are, in turn, transmitted to a user's workstation 20 on a real-time basis over Internet 21. Because the user is notified of an investor's transaction status, he or she can intercede and/or act in a proactive manner; for example, by contracting the investor if it appears that the investor needs assistance with a transaction. In this way, the user can protect an investor outside of the system of the present invention from executing deleterious financial transactions. The monitoring system also alerts a workstation 20 within the system where an investment transaction forum, such as those described above, blocks an investor from entering an investor-mediated transaction, or alternatively allows an investor to successfully complete a particular transaction.

Management: trade monitor operations problem ticket tracking and reporting system, and client account cross reference lookup/routing used to maintain audit of account number changes.

Opportunities and Events: new and old corporate actions a financial adviser view his or her client account balances (called FYIE), maturing holding, commissions revenue history, etc., and an enhanced version of FYIE that provides financial adviser with upgrade recommendations for his clients particular to swap or upgrade security recommendations.

Support: account maintenance fee, aged check system, disbursement confirmation system, fed funds transfer system, messages, securities information inquiry and security glossary lookup.

It should be recognized that any useful financial application may be included as part of system 10 and accessible via browser 200.

Figure 10B:
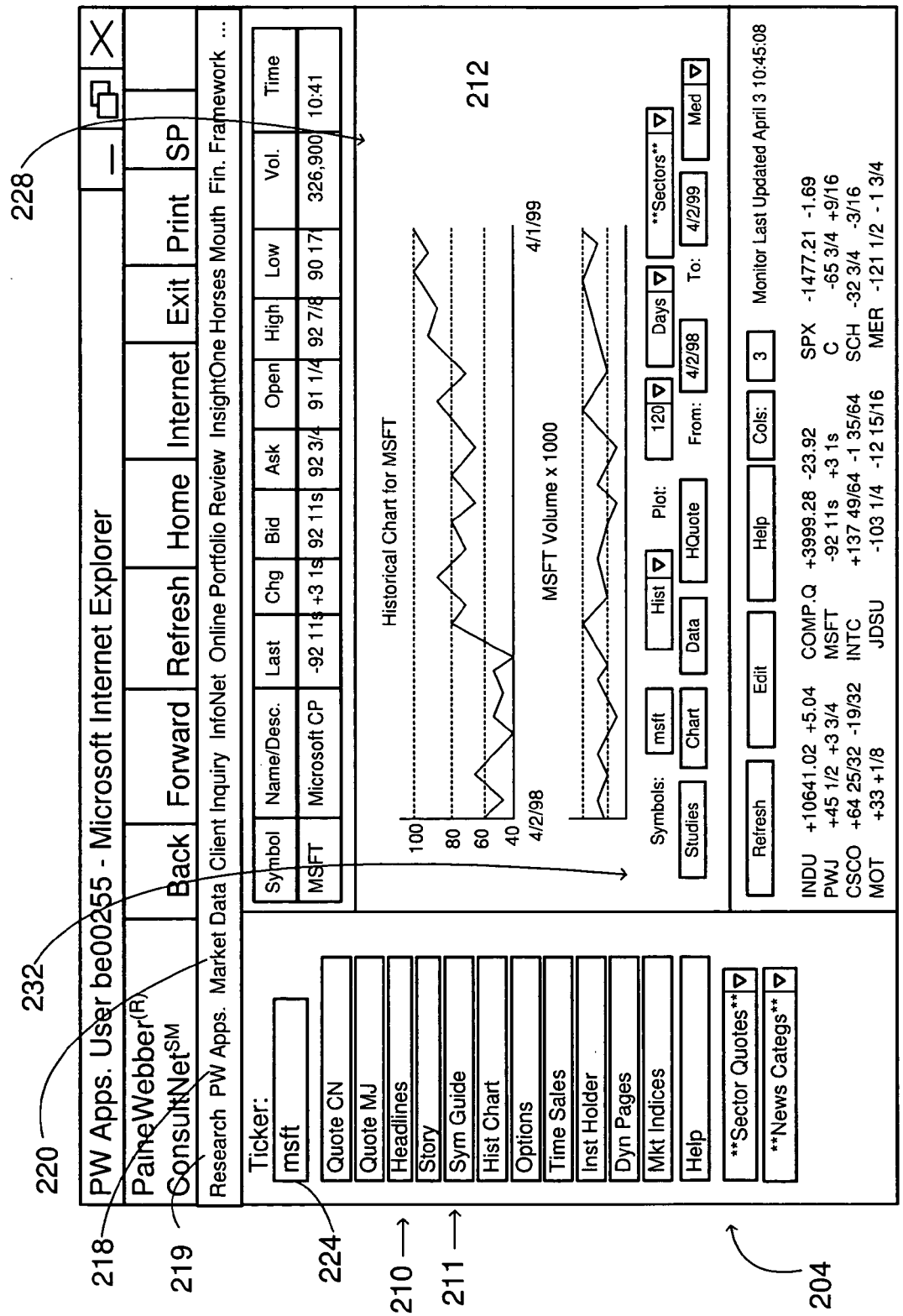

B. Market Data:

FIGS. 10A–B show an exemplary market data function menu 210, which is provided upon activation of the market data feature selection 220. Market data function menu 210 provides a plurality of market data functions for selection. Generally, market data functions may provide real-time access to quotes (e.g., last, bid, ask, NASDAQ, Commodities, etc.), news, historical information (e.g., daily, weekly), charting, dynamic market indicators (e.g., percent up and down, point gainers and losers, foreign exchanges, financial futures, most active trades and the like), news from popular services and the Dow Jones, market views, a fixed income calculator, symbol guide and news and limit alerts as well as the ability to customize charting features and web pages.

Each market data function presents real-time market data in a useful manner. The market data function menu 210 includes a number of functions that allow a user to review market data. For example, a user can obtain headlines, and specific information on a security such as a quote, full quote, today's headlines, options, time and sales, institutional holders, and the like. Other optional information such as a market snapshot of indices, market view, an overview of several exchanges (i.e., NYSE, NASDAQ, AMEX), sector quotes, and news categories may also be accessed. As shown in FIG. 10B, historical charts can be plotted for a given security. Preferably, the market data functions access market data server 114 (FIG. 1) on a real-time basis, e.g., one that accesses Quotron by Reuters. As previously noted, the market data functions may access other market data servers, maintained as part of branch server 102. The information may be updated by clicking on a refresh button on toolbar 202.

Using mechanisms well known to those with skill in the art, any relevant market information may be accessible within the market data functions. For instance, FIG. 10A shows a market data function's headlines function view window 226 for the stock PWJ; and FIG. 10B shows a history chart function view window 228 for stock MSFT. A window 224 is preferably provided for entry of a particular stock to be evaluated or any market data function selected.

Advantageously, the market data functions permit customization of any of the displayed information and allows for multiple representations on a single screen. As shown, each view window 228, 229 may also provide functionality selections 232 particular to that view window. For instance, as shown in FIG. 10B, the historical chart function view window 228 provides functionality selections for range of dates, studies, chart, data, and historical quotes. Additional customization and functionality for a given function can be provided on separate dialogs, as shown in FIG. 10C, as necessary. For instance, the dialog shown in FIG. 10C is for customizing the securities and/or indices on the monitor list function view window 229 shown in FIG. 10B.

Each user entitled to market data is assigned an identification for access, e.g., a user is a Reuters Plus market data client, and has an identification for that service. Each user so entitled to subscribes to symbols, e.g., stock symbols, referenced through an entry screen such as that shown in FIG. 10C.

Once connected, data flows in real time to the user's market data functions. Changes are indicated on screen ad the user has the ability to set options such as colors, font sizes, audible alerts, blinking, etc. that will be saved as part of his or her preference profile. The receiving of the market data updates is frequently called "dynamic, real-time, streaming quotes". Once the user obtains financial information of interest, he or she can utilize this information to advise an investor, conduct exchanges on behalf of an investor, chart an investor's investment progress, or the like. In this way, the user can provide the investor with timely, proactive financial advice.

An additional functionality of a market data function may include a customized quote window 69 (shown in FIGS. 100A–B), which may contain information such as last price, bid, ask, high, low, etc. Quote window 69 may be continuously displayed on video display 24 as part of browser interface 200, i.e., it is fully integrated into all data displayed from any component server of host server 100 from which data is retrieved or sent. The symbol in the quote window 69 may also be dynamically linked to the symbol focused on by a user's cursor, or mouse 28.

Figure 11:
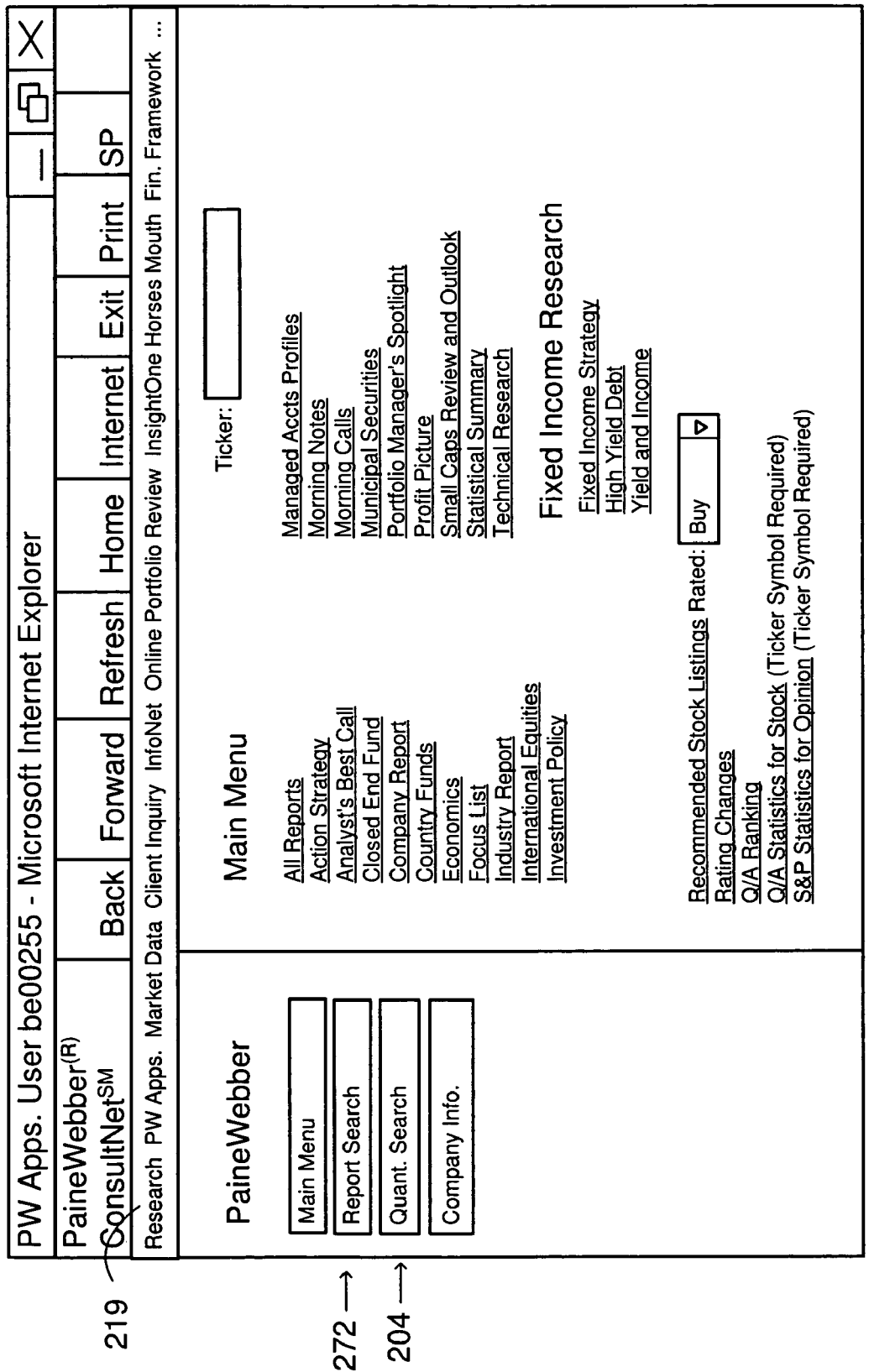
FIG. 11 is a video screen display illustrating a research feature.

C. Research:

FIG. 11 shows an exemplary research menu 272 provided upon activation of the research feature selection 219. Research menu 272 includes a number of research objects for researching investment information. Exemplary research menu 272 selections include main menu, report search, quantitative search and company information. A exemplary research object is the proprietary PaineWebber PWER II system, which searches for companies by, for example, industry, price, P/E ratio, growth rate and rating, utilizing multiple search methods such as by date, author, title, industry, subject code, ticker system, company name, report type and country.

D. Client Inquiry:

FIG. 12 shows an exemplary client inquiry menu 250 that is provided upon activation of the client inquiry feature selection 221. Client inquiry object selections allow a user to search for a client 252, obtain a client balance 254 and select an account 256 for investigation. A user may also evaluate an account in a variety of ways through account evaluation menu 258. Menu 258 may include evaluation selections of, for example activity, unrealized gains/losses (shown in FIG. 12), statement household (i.e., client specific account categorization), insurance, realized gains/losses and value.

Figure 13:
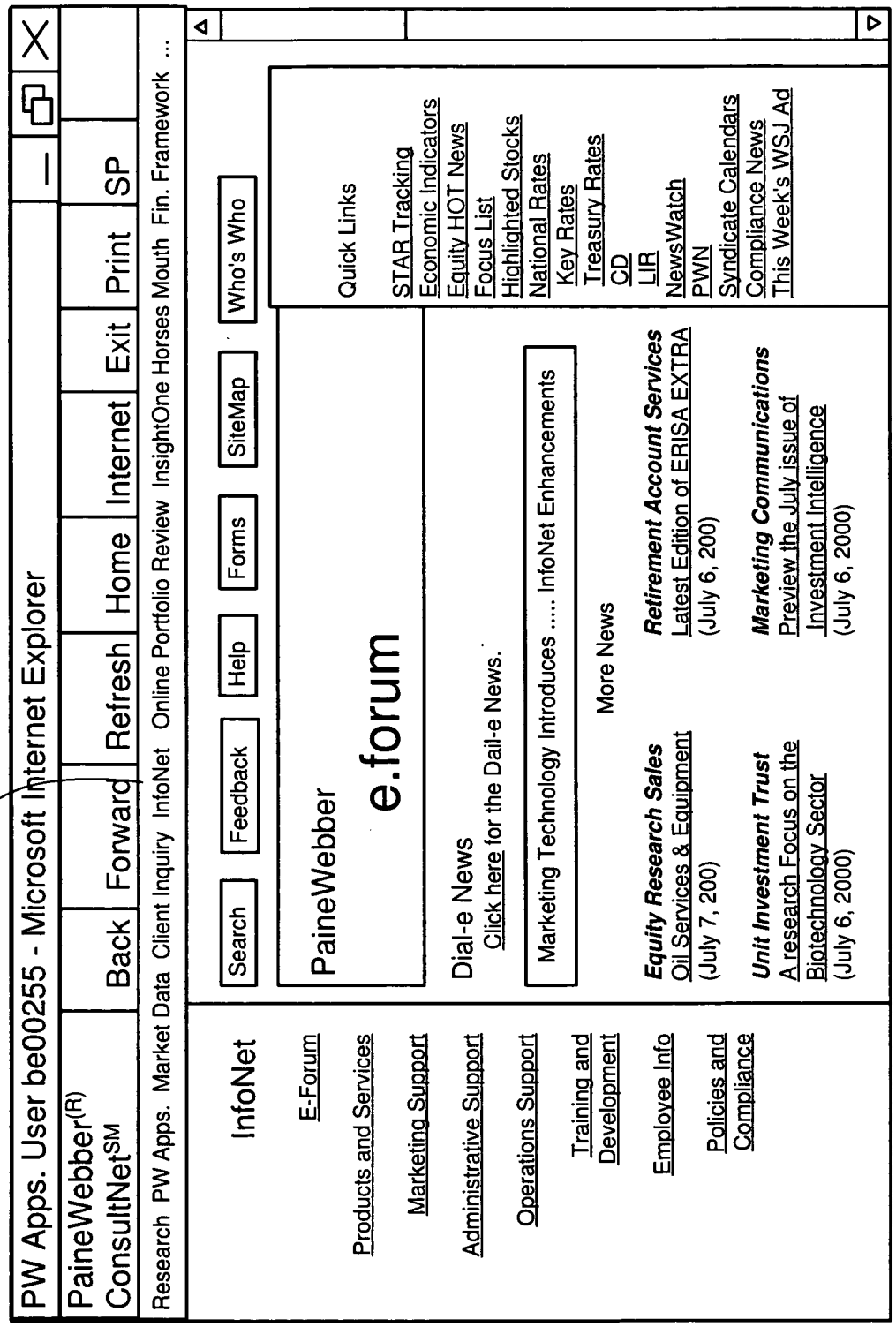
FIG. 13 is a video screen display illustrating a browser based information network feature.
Figure 14:
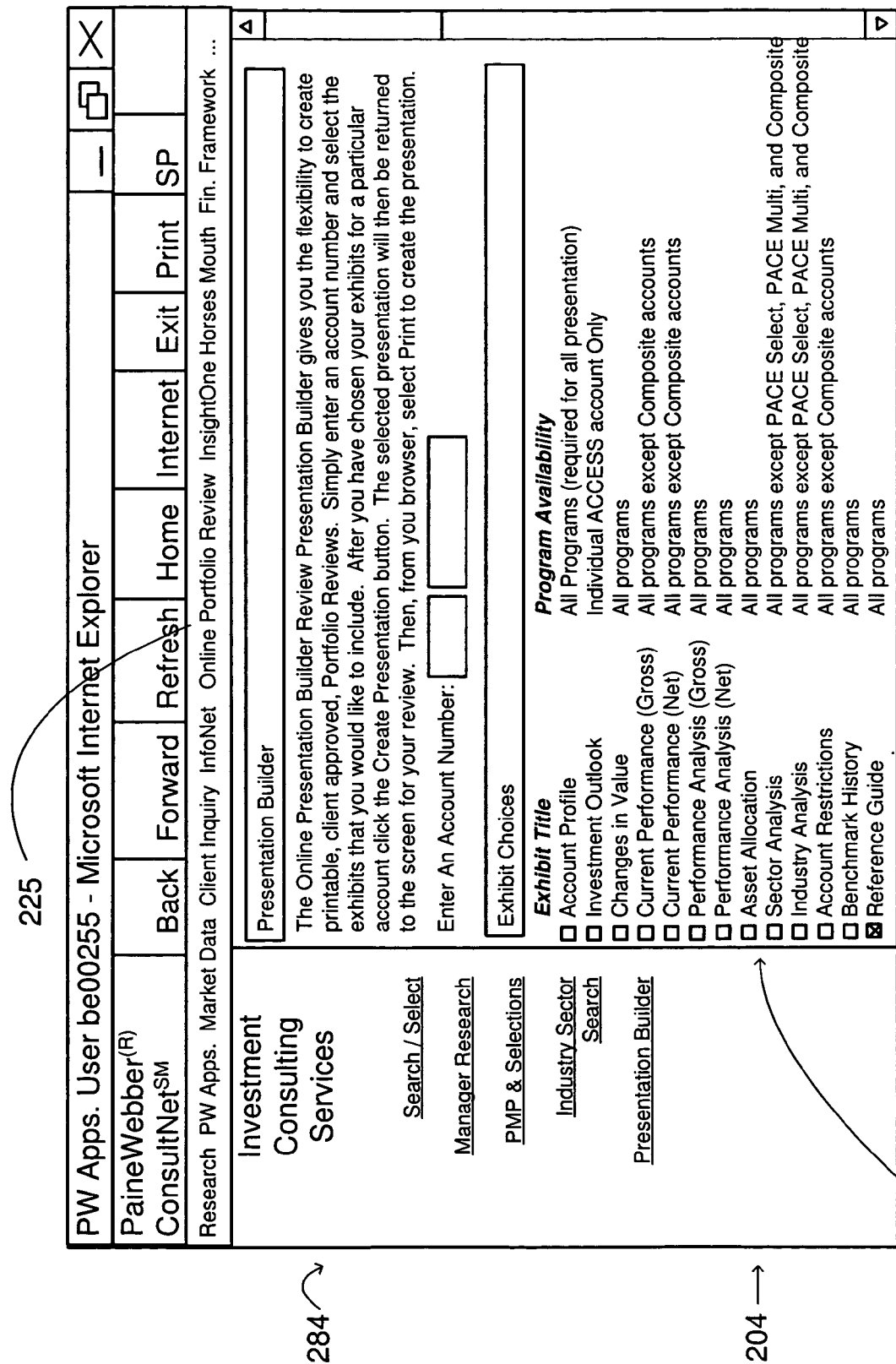
FIG. 14 is a video screen display illustrating an online portfolio review feature.

E. InfoNet:

FIG. 13 shows an exemplary information network (called InfoNet) menu 280 that is provided upon activation of the InfoNet feature selection 223. FIG. 13 also shows a start Web page for InfoNet. InfoNet is a proprietary browser-based information network that enables users to conduct searches for ideas and information, provides links to related pages (for example, a sales idea, a marketing brochure, etc.), provides subscriptions to popular publications and research, access to third-party news, information and sales ideas, and allows a user to fill out and forward forms to an investment forum outside of the system 10. In particular, the InfoNet menu 280 may provide selections for an E-forum for employees, corporate products and services, marketing support, administrative support, operations support, training and development, employee information, policies and compliance and correspondent service corporation.

F. Online Portfolio Review:

FIG. 14 shows exemplary online portfolio review menu 284 provided upon activation of the online portfolio review feature selection 225. Menu 284 allows a user to select from a number of portfolio review objects to create exhibits for, e.g., presentations to a client. For instance, one portfolio review object 282 creates presentation exhibits of a client portfolio. Selection of a presentation exhibit 282 automatically creates the requested exhibit on the display and allows printing of the exhibit. From portfolio review menu 284, a user may also select other exhibit topics such as manager research (provides information about product managers), PMP (portfolio management program) & Selections, industry sector search for obtaining exhibits regarding a particular industry sector, and presentation builder (shown in FIG. 14).

Figure 15:
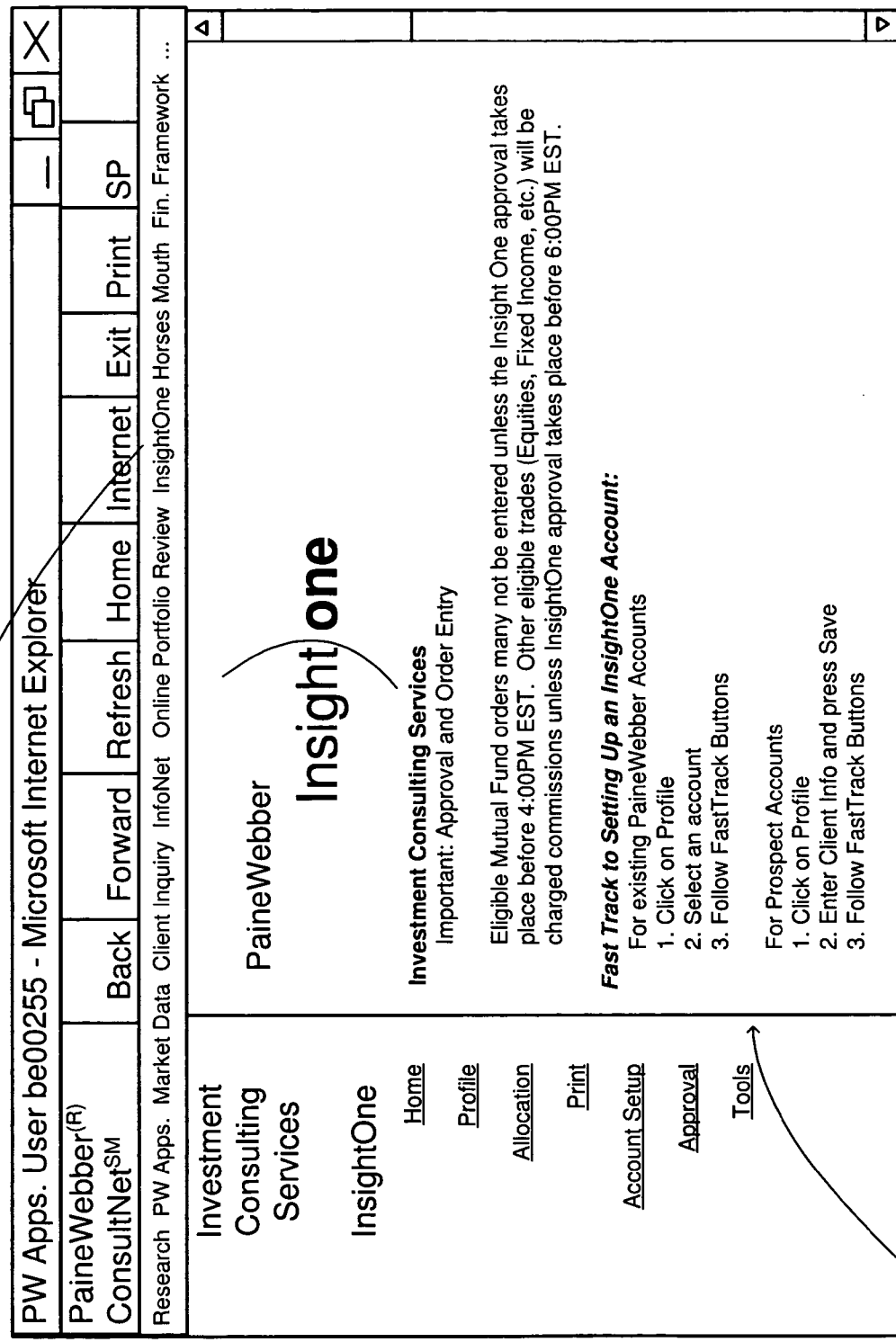
FIG. 15 is a video screen display illustrating an InsightOne feature.
Figure 16:
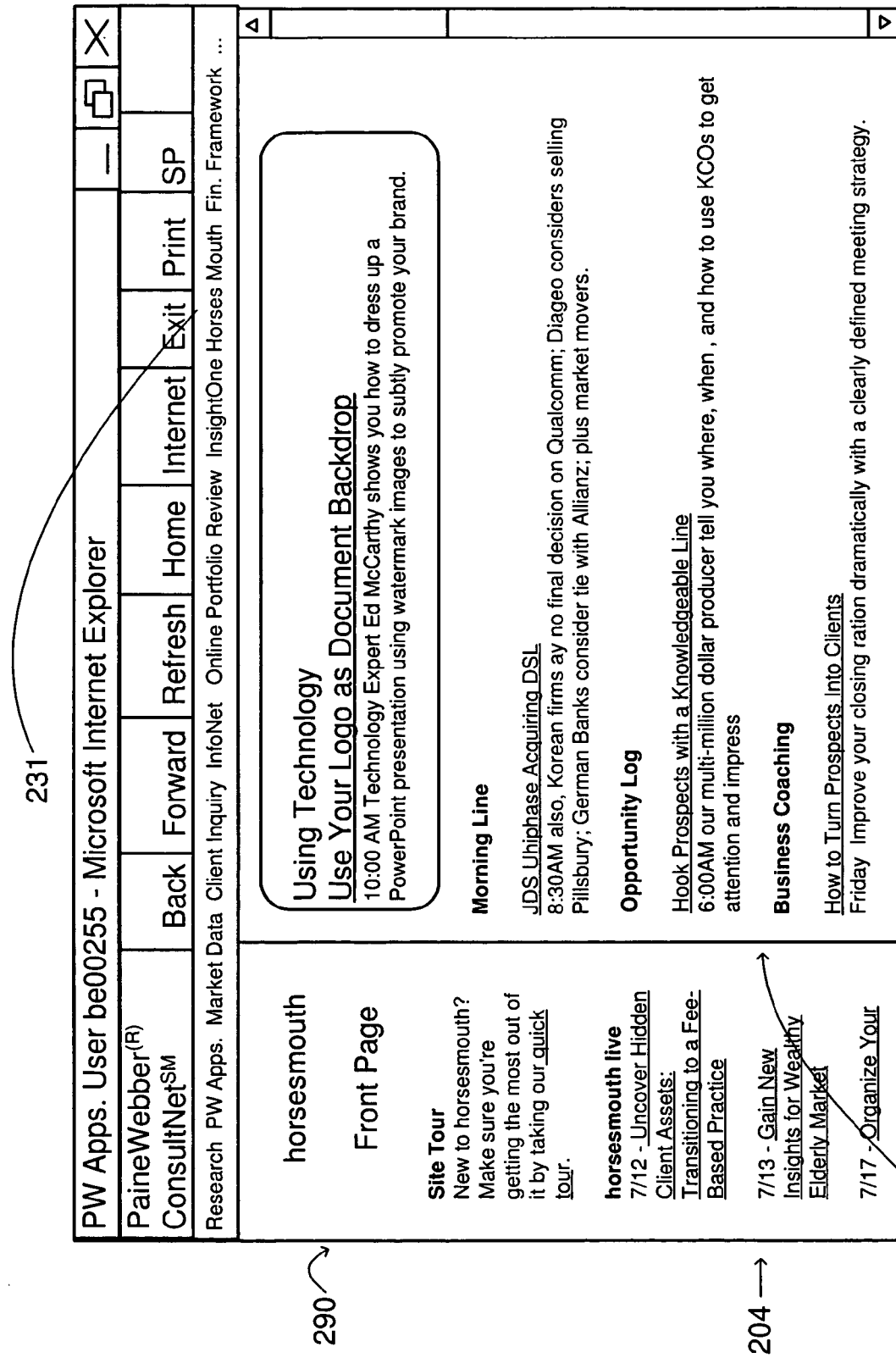
FIG. 16 is a video screen display illustrating a third party content Web site feature.

G. InsightOne Web Site:

FIG. 15 shows an exemplary InsightOne menu 290 and web site home page that is provided upon activation of the InsightOne Home Page feature selection 227. InsightOne is a Web site that provides a non-discretionary client brokerage program that performs trade based on payment of a single annual fee calculated from eligible assets.

H. HorsesMouth:

FIG. 16 shows an exemplary HorsesMouth web site 300 provided upon activation of the HorsesMouth feature selection 231. HorsesMouth is a third party Web site that provides news, investor forums, investor advice and more. Through conventional browser selections, a user may peruse and read information provided on the HorsesMouth Web site.

Figure 17:
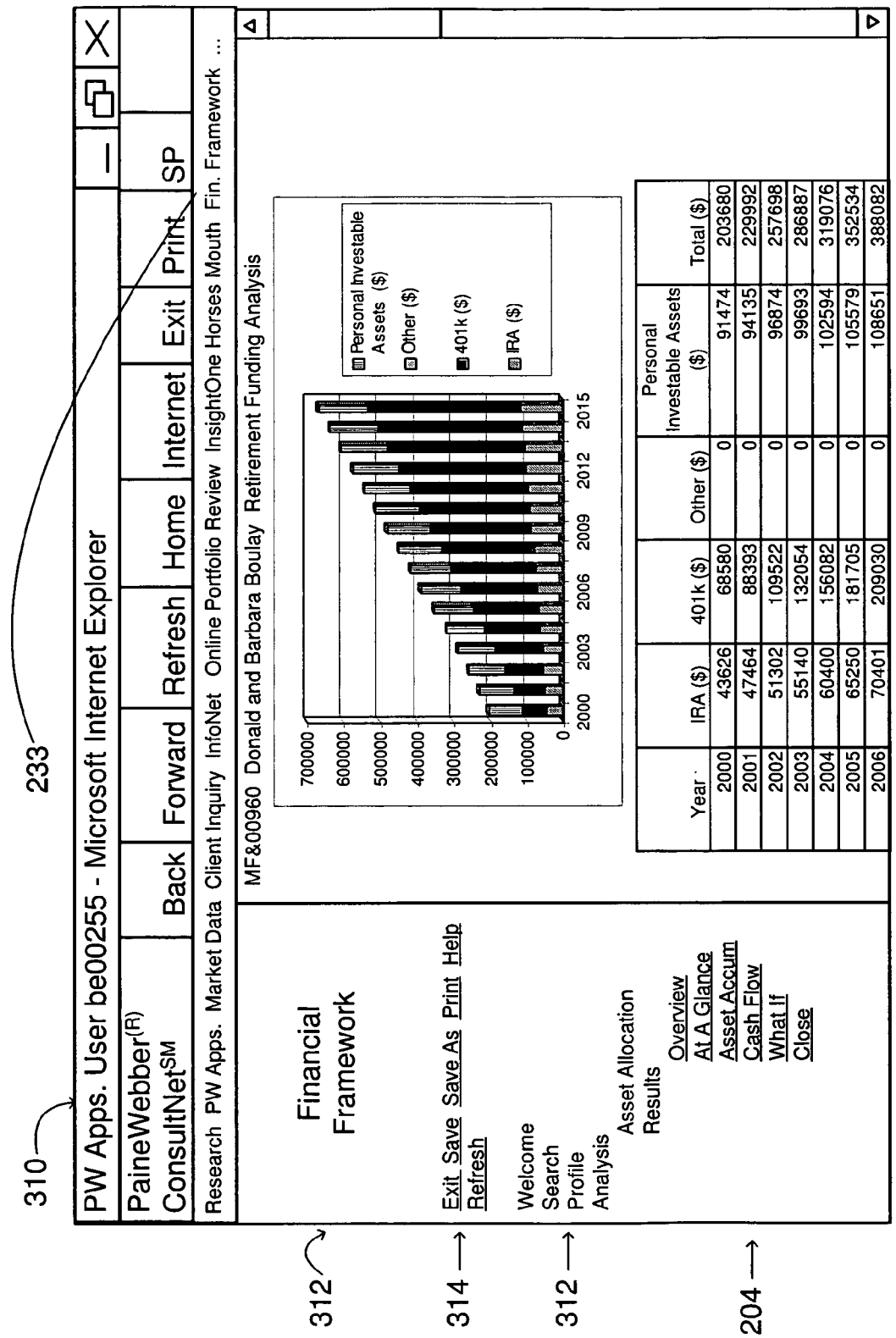
FIG. 17 is a video screen display illustrating a financial framework feature.

I. Financial Framework:

FIG. 17 shows a financial framework or planning application 310. From financial planning application 310, a user may profile clients and present appropriate asset allocations and investment alternatives. Financial planning application 310 displays an investor's current asset allocation and suggests an alternative allocation based on risk tolerance. It also analyzes progress toward goals using established growth rate assumptions; allows for customization of asset allocation and change in certain variables to assess the impact on an investor's financial situation; and allows for the assessment of the impact of inflation and other factors on investment results. The financial application can also be used for a retirement funding analysis, that is, to analyze the retirement savings and income needs of clients who are planning for retirement or who are already retired; for an education funding analysis, which address the funding needs for preparatory, undergraduate, and graduate schools; or other similar analysis.

An exemplary financial framework menu 312 provides selections to welcome a user and/or client and provides instructions on use of the application 310, search for client information, generate a client profile, and analyze a client portfolio. Under the analysis selection, a user may select from asset allocation to determine where a client has his or her investments and results. The results selection also includes selections such as overview, at a glance, asset accum, cash flow what if, and close. Overview allows a user to generally review a client portfolio. At a glance provides a summary of the client portfolio. Asset accumulation provides a client's account(s) gains and analyzes progress toward goals using established growth rate assumptions. Cash flow provides an indication of the liquidity of the client's assets. What if allows a user to suggest an alternative allocation based on risk tolerance. It also allows for customization of asset allocation and change in certain variables to assess the impact on an investor's financial situation; and it allows for the assessment of the impact of inflation and other factors on investment results. Close provides information about closing a client account.

Financial framework application 310 also provides selections 314 for exiting, saving, printing, help and refreshing the application.

J. Additional Browser Interface Features:

Referring to FIGS. 8B, 9 and 18–21, additional browser interface 200 features will be described. Additional features may include a configuration setup selection 234, a split screen selection 236 and a favorites selection 238.

Figure 18:
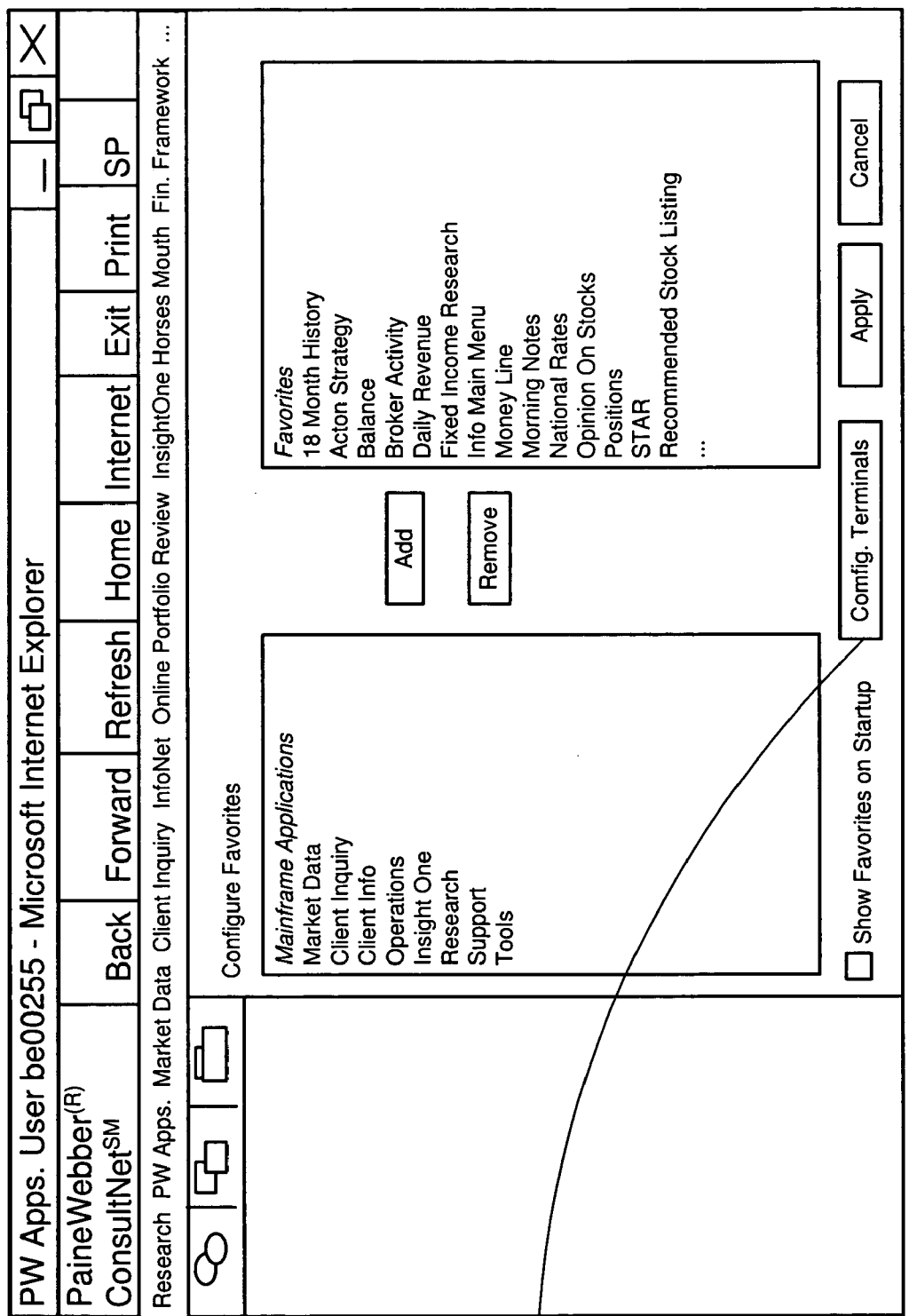
FIG. 18 is a video screen display illustrating a favorite selection screen.
Figure 19:
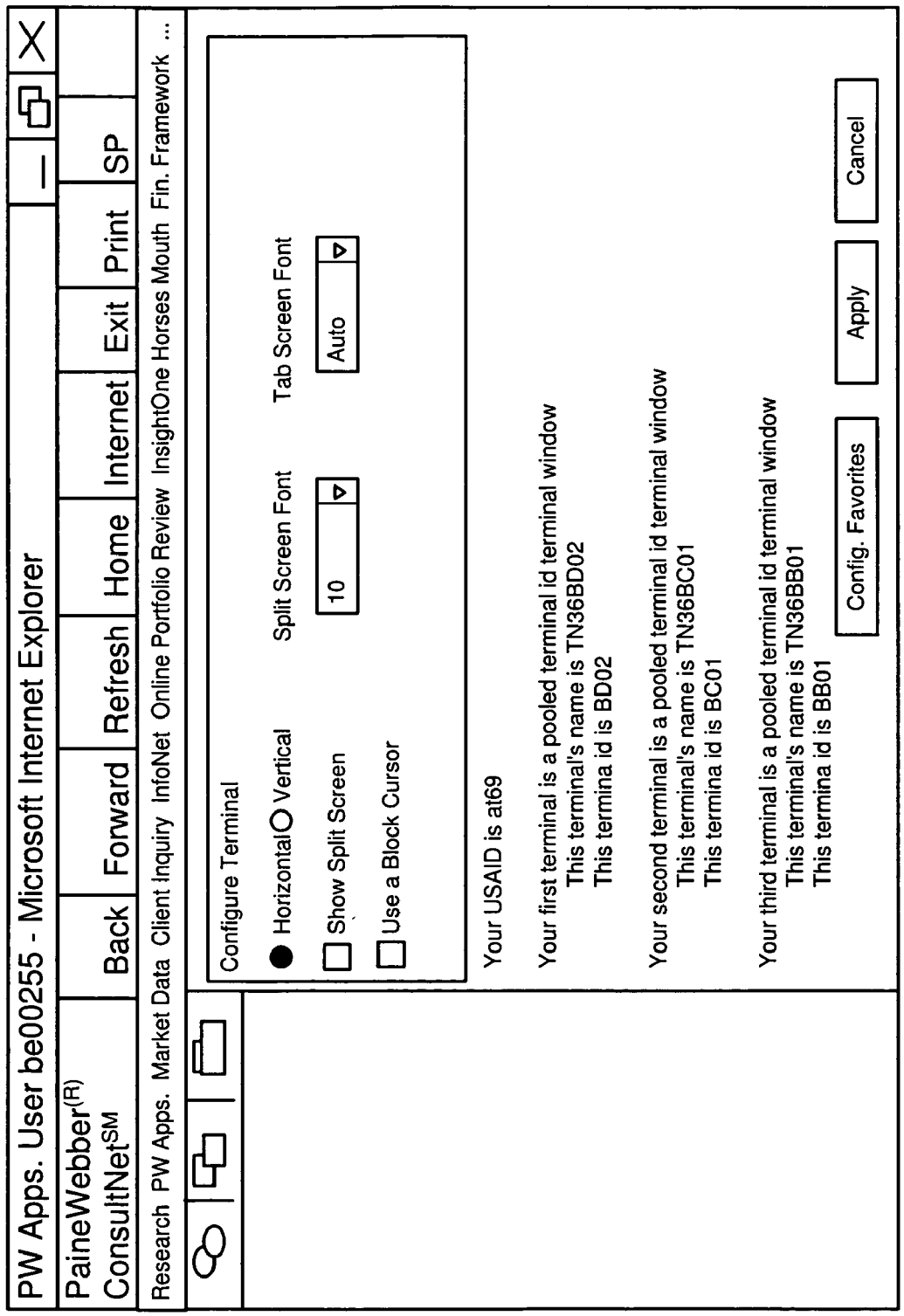
FIG. 19 is a video screen display illustrating a terminal configuration.
Figure 21:
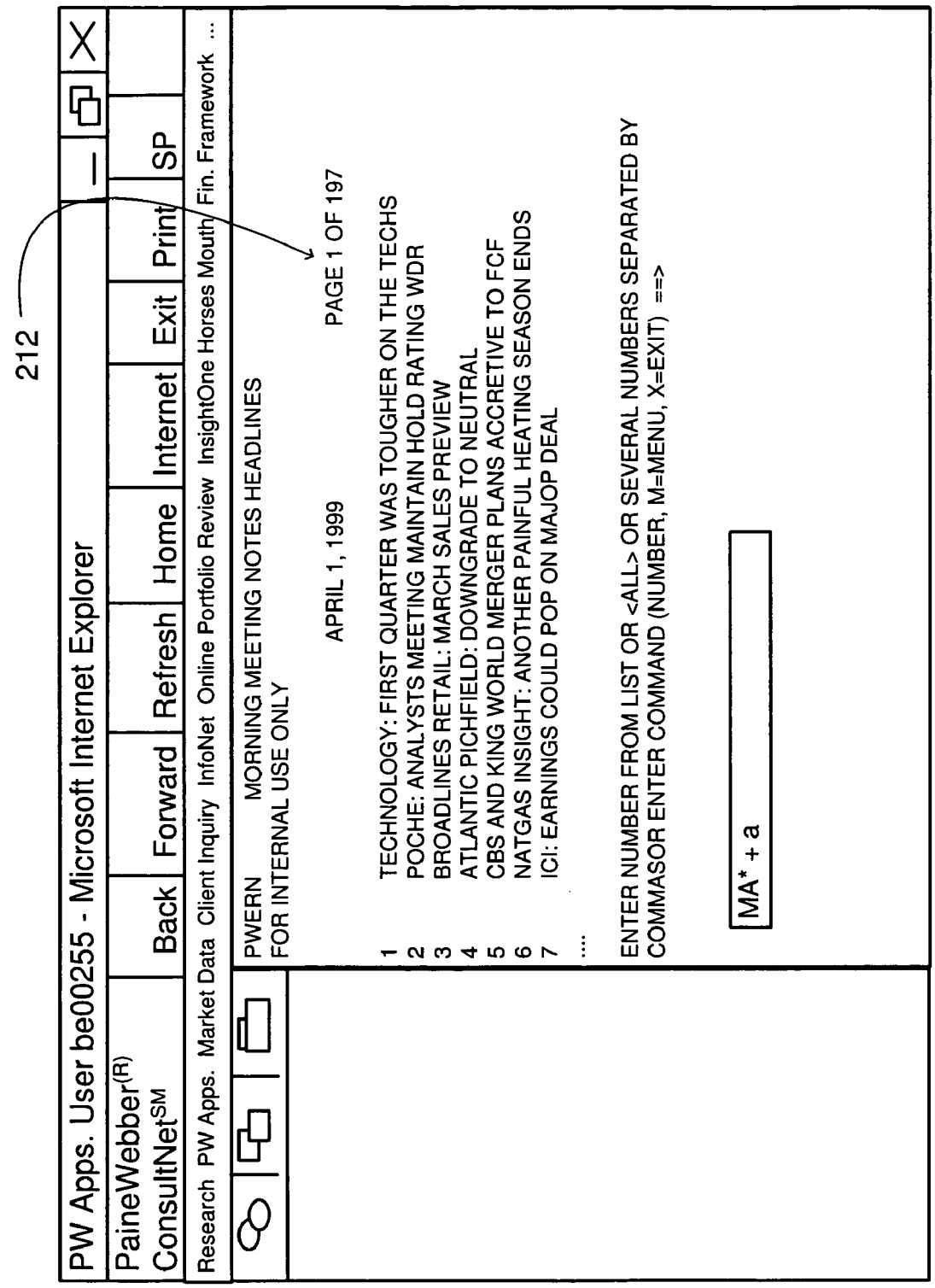
FIG. 21 is a video screen display illustrating a favorites menu.

Activation of configuration setup selection 234 launches a favorites selection screen 242, shown in FIG. 18, so a user may customize a favorites menu 244, shown in FIG. 21, in a known fashion. In this way, a user may customize a menu to include favorite applications and market data functions. Also available on favorites selection screen 242 is a terminal configuration selection 246 that launches a setup screen 248, shown in FIG. 19, for setting the attributes of terminals. Terminals are different view windows having different set objects operative therein. Through setup screen 248, the appearance of one or more terminals may be adjusted. As shown in FIG. 9, (between toolbar 202 and view window 212) different terminals may be selected once setup has been effectuated.

Activation of split screen selection 236 (FIGS. 8B, 9 and 18–21) launches a split screen shown in FIGS. 10 and 20, with two view windows 212, 213. Activation of favorite selection 238 activates a favorite menu 242 shown in FIG. 21.

It should be recognized that each object may include functionality selections particular to the object selected. For instance, in FIG. 10A, functionality selections 232 are provided for manipulating data in market data function.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A computer readable medium having financial advisor software stored thereon that when executed on a computing device displays an interface comprising:
   an application menu;
   a market data function menu; and
   a display window;
   wherein the market data function menu comprises a market data function selection that upon activation displays market data in the display window in real time;
   wherein the application menu comprises:
   a client information application selection that upon activation presents a display in the display window that enables a user of the financial advisor software to search for and monitor client account and client transaction information in the display window in real time, including real time information from an investor trading system regarding an active client transaction at the investor trading system;
   a research application selection that upon activation presents a display in the display window that enables the user of the financial advisor software to research investments;
   a financial planning application selection that upon activation presents a display in the display window that enables the user of the financial advisor software to analyze the impact of the active client transaction and to determine alternative asset allocations and specific investment alternatives;
   a broker entry application selection that upon activation presents a display in the display window that enables the user of the financial advisor software to intercede in the active client transaction at the investor trading system in real time by entering or correcting client transaction orders through the display based on information obtained from one or more selections of the application menu and the market data function menu.

2. The computer readable medium of claim 1, further comprising a management application that enables the use of the financial advisor software to report problems in execution of client transactions.

3. The computer readable medium of claim 1, wherein the client information application comprises a client inquiry feature selection that enables the user of the financial advisor computing device to search for and display in the display window information that includes client account balances, client account statements, client transaction confirmations, and client tax statements.

4. A network based financial services system comprising:
   computing devices having financial advisor software stored thereon that when executed displays an interface operable on the computing devices;
   one or more servers connected directly or indirectly to the computing devices via the Internet having access to a plurality of applications and a plurality of market data functions, at least one of the one or more servers receiving real time information from an investor trading system regarding an active client transaction at the investor trading system and storing the real time information in at least one database;
   wherein the interface comprises:
   an application menu;
   a market data function menu; and
   a display window;
   wherein the market data function menu comprises a market data function selection that upon activation displays market data in the display window in real time;
   wherein the application menu comprises:
   a client information application selection that upon activation presents a display in the display window that enables a user of the financial advisor software to search for and monitor client account information and client transaction information stored in the at least one database in the display window in real time, including the real time information from the investor trading system regarding the active client transaction at the investor trading system;
   a research application selection that upon activation presents a display in the display window that enables the user of the financial advisor software to research investments;
   a financial planning application selection that upon activation presents a display in the display window that enables the user of the financial advisor software to analyze the impact of the active client transaction and to determine alternative asset allocations and specific investment alternatives;
   a broker entry application selection that upon activation presents a display in the display window that enables the user of the financial advisor software to intercede in the active client transaction at the investor trading system in real time by entering or correcting client transaction orders through the display based on information obtained from one or more selections of the application menu and the market data function menu.

5. The system of claim 4, further comprising a management application that enables the use of the financial advisor software to report problems in execution of client transactions.

6. The system of claim 4, wherein the client information application comprises a client inquiry feature selection that enables the user of the financial advisor computing device to search for and display in the display window information that includes client account balances, client account statements, client transaction confirmations, and client 1099 statements.

7. The system of claim 4, wherein an authentication system is connected to at least one of the one or more servers, the authentication system comprising:
   a controller;
   a shell initialization module;
   a browser interface launch module;
   a password module;
   and a move/add/change function;
   one or more databases storing the level of entitlement of the user to the client account and the client transaction information.

* * * * *